United States Patent
Rezk et al.

(10) Patent No.: US 9,557,407 B1
(45) Date of Patent: *Jan. 31, 2017

(54) RADAR DETECTION FOR ADJACENT SEGMENTS IN WIRELESS COMMUNICATIONS

(71) Applicant: QUALCOMM Incorporated, San Diego, CA (US)

(72) Inventors: Meriam Khufu Ragheb Rezk, Campbell, CA (US); Kai Shi, San Jose, CA (US); Ning Zhang, Saratoga, CA (US); Srinivas Jasti, Fremont, CA (US); Chao Cheng, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,089

(22) Filed: Aug. 21, 2015

(51) Int. Cl.
*G01S 13/00* (2006.01)
*G01S 7/02* (2006.01)
*H04B 1/12* (2006.01)

(52) U.S. Cl.
CPC ............... *G01S 7/021* (2013.01); *H04B 1/123* (2013.01)

(58) Field of Classification Search
CPC .............................. G01S 2007/356; G01S 7/02
USPC ...................... 342/196, 175; 455/66.1, 556.1
See application file for complete search history.

(56) References Cited

U.S. PATENT DOCUMENTS

| | | | |
|---|---|---|---|
| 6,271,787 B1 * | 8/2001 | Springer | G01S 7/021 342/13 |
| 6,697,013 B2 * | 2/2004 | McFarland | G01S 7/021 342/159 |
| 8,179,825 B2 * | 5/2012 | Steer | G01S 7/021 342/57 |
| 8,207,884 B2 * | 6/2012 | Wen | G01S 7/021 342/20 |
| 8,660,218 B2 | 2/2014 | Maleh et al. | |
| 8,660,219 B2 | 2/2014 | Boehlke | |
| 8,831,155 B2 | 9/2014 | Yucek et al. | |
| 8,861,568 B2 | 10/2014 | Petersen | |
| 9,429,642 B1 | 8/2016 | Rezk et al. | |
| 2013/0128927 A1 | 5/2013 | Yucek et al. | |
| 2014/0120966 A1 | 5/2014 | Fischer et al. | |
| 2014/0253361 A1 | 9/2014 | Rezk et al. | |
| 2014/0254346 A1 | 9/2014 | Rezk et al. | |
| 2014/0313071 A1 | 10/2014 | McCorkle | |
| 2014/0315506 A1 | 10/2014 | Rezk et al. | |
| 2015/0355319 A1 | 12/2015 | Roger et al. | |
| 2016/0131743 A1 * | 5/2016 | Addison | G01S 7/352 342/196 |
| 2016/0131744 A1 | 5/2016 | Addison et al. | |

* cited by examiner

*Primary Examiner* — Sonny Trinh
(74) *Attorney, Agent, or Firm* — Paradice and Li LLP

(57) ABSTRACT

A method and apparatus are disclosed for searching for a radar signal within signals received by a wireless device. The wireless device may receive signals within a first frequency segment and a second frequency segment, which is adjacent to the first frequency segment. The wireless device may determine Fast Fourier Transform (FFT) bins associated with the first frequency segment and the second frequency segment. The wireless device may combine the FFT bins associated with the first frequency segment and the second frequency segment and may search for the radar signal within the combined FFT bins.

20 Claims, 14 Drawing Sheets

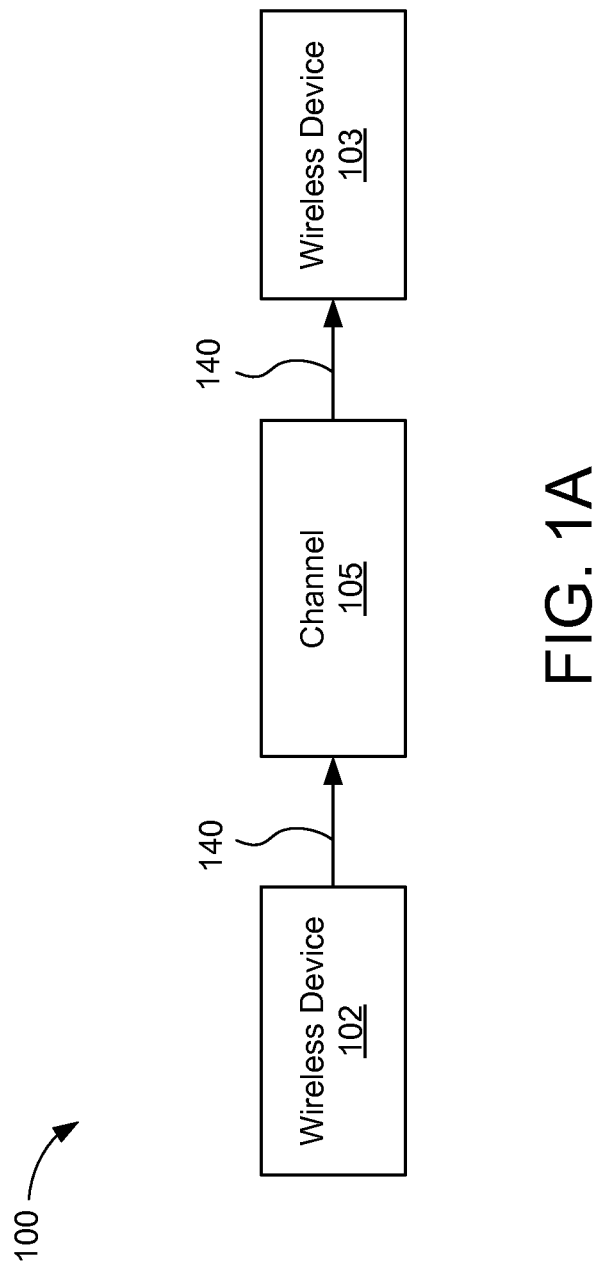

RADAR DETECTION FOR ADJACENT SEGMENTS IN WIRELESS COMMUNICATIONS

TECHNICAL FIELD

The present embodiments relate generally to wireless communications, and specifically to detecting radar signals within operating frequencies used for wireless communications.

BACKGROUND OF RELATED ART

Wireless devices may share operating frequencies with radar devices within the 5 GHz frequency band. Portions of the 5 GHz frequency band may be referred to as a Dynamic Frequency Selection (DFS) frequency band. A wireless device may follow DFS protocols to vacate operations within portions of a shared frequency band when a radar signal, possibly from a radar device, is detected. Detecting radar signals may be difficult when the wireless device uses contiguous, but distinct frequency segments for wireless communications. For example, the wireless device may transmit signals through a communication channel that includes a first frequency segment and a second frequency segment that is adjacent to the first frequency segment. Signals associated with the first frequency segment and signals associated with the second frequency segment may be captured (received) by separate hardware and/or software modules of the wireless device. As a result, a varying frequency (e.g., chirping) radar signal may be difficult to detect by the wireless device, for example, because the radar signal may appear within either or both of the first and second frequency segments. Missed radar signal detections may cause interference with radar devices, while an over-sensitivity to noise within the communication channel may cause a false radar signal detection. Interference with radar signals may cause the wireless device to violate one or more regulations, and false radar signal detections may impede performance of the wireless device by unnecessarily vacating operations within the communication channel.

Thus, there is a need to improve radar signal detection in wireless devices communicating through adjacent frequency bands in a wireless communication channel.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Methods of searching for a radar signal by a wireless device are disclosed. In accordance with example embodiments, the wireless device may receive signals within a first frequency segment and a second frequency segment, which is adjacent to the first frequency segment. The wireless device may determine a first set of Fast Fourier Transform (FFT) bins associated with the first frequency segment and a second set of FFT output values associated with the second frequency segment. The wireless device may combine the first set of FFT bins and the second set of FFT bins to determine a combined FFT output that spans the first frequency segment and the second frequency segment. The wireless device may search for the radar signal based, at least in part, on the combined FFT output.

In accordance with example embodiments, the wireless device may receive signals within a first frequency segment and a second frequency segment, which is adjacent to the first frequency segment. The wireless device may upsample data associated with the signals received within the first frequency segment to generate a first set of upsampled data. The wireless device may upsample data associated with signals received within the second frequency segment to generate a second set of upsampled data. The wireless device may combine the first set of upsample data and the second set of upsampled data to generate a combined digital signal. The wireless device may determine FFT bins based, at least in part, on the combined digital signal. The wireless device may search for the radar signal based, at least in part, on the FFT bins.

A wireless device is disclosed that may include a transceiver, a processor and a memory to store instructions that when executed by the processor cause the wireless device to: receive signals within a first frequency segment and a second frequency segment, wherein the second frequency segment is adjacent to the first frequency segment; determine a first set of FFT bins associated with the first frequency segment and a second set of FFT bins associated with the second frequency segment; combine the first set of FFT bins and the second set of FFT bins to determine a combined FFT output that spans the first frequency segment and the second frequency segment; and search for a radar signal based, at least in part, on the combined FFT output.

BRIEF DESCRIPTION OF THE DRAWINGS

The present embodiments are illustrated by way of example and are not intended to be limited by the figures of the accompanying drawings. Like numbers reference like elements throughout the drawings and specification.

FIG. 1A shows an example communication system within which example embodiments may be implemented.

DETAILED DESCRIPTION

Figure 1B:
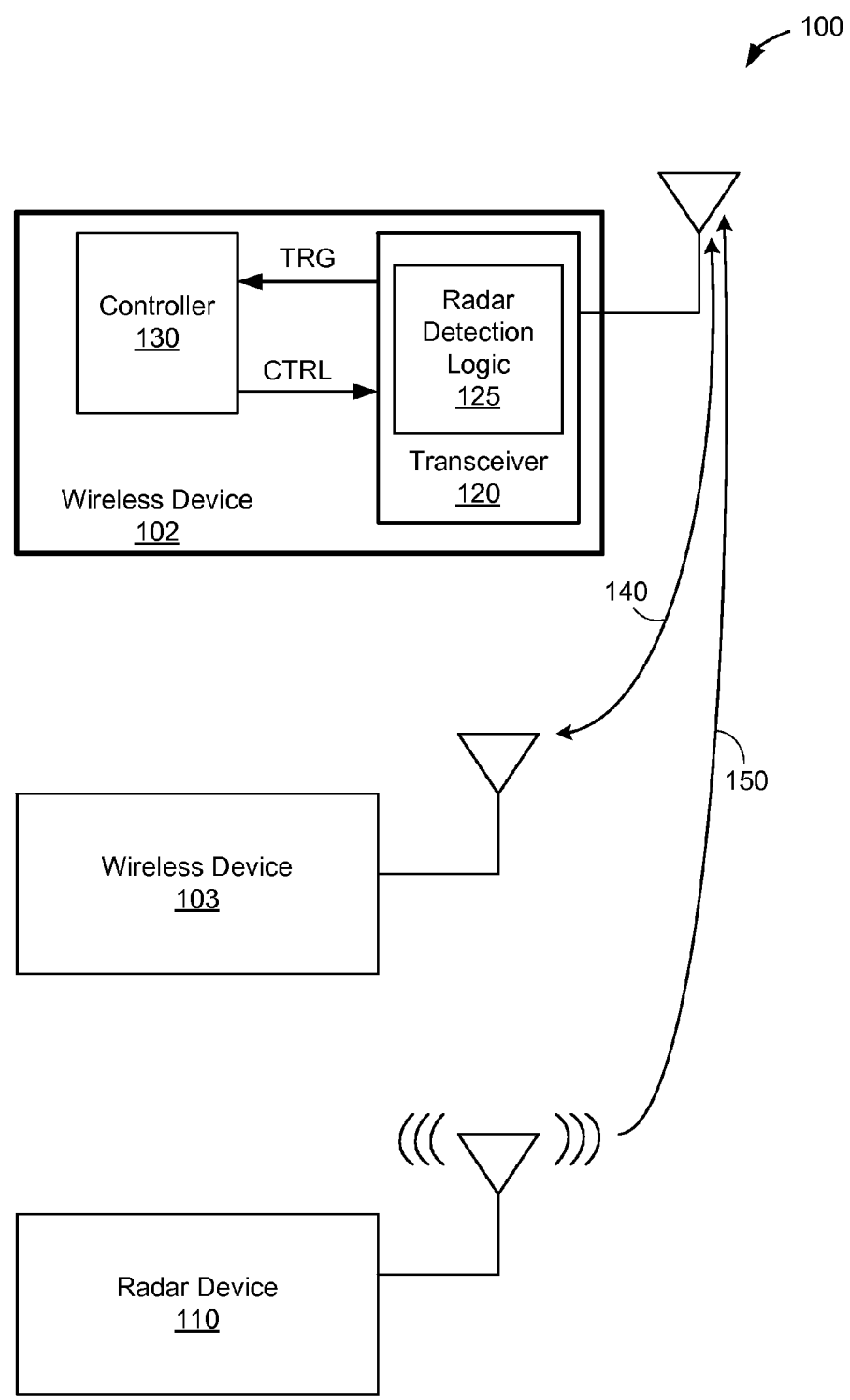
FIG. 1B shows the example communication system of FIG. 1A in the presence of a radar device.

The present embodiments are described below in the context of Wi-Fi enabled devices for simplicity only. It is to be understood that the present embodiments are equally applicable for devices using signals of other various wireless standards or protocols. As used herein, the terms "wireless local area network (WLAN)" and "Wi-Fi" may include communications under the IEEE 802.11 standards (including standards describing multiple input/multiple output communications), BLUETOOTH®, HiperLAN (a set of wireless standards, comparable to the IEEE 802.11 standards, used primarily in Europe), and other technologies used in wireless communications.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

FIG. 1A shows an example communication system 100 within which example embodiments may be implemented. The communication system 100 includes wireless devices 102 and 103. Although only two wireless devices 102 and 103 are shown in FIG. 1A for simplicity, it is to be understood that the communication system 100 may include any number of wireless devices. The wireless devices 102 and 103 may be any suitable Wi-Fi enabled device including, for example, a cell phone, laptop, tablet computer, wireless access point, or the like. Each of the wireless devices 102 and 103 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each of the wireless devices 102 and 103 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 4, 6, 9, and 12.

The one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices within distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within wireless devices 102 and 103 may be any technically feasible transceiver such as a ZigBee transceiver described by a specification from the ZigBee Alliance, a WiGig transceiver, and/or a HomePlug transceiver described by a specification from the HomePlug Alliance.

The wireless devices 102 and 103 may exchange signals (e.g., Wi-Fi signals) 140 over a communication channel 105. The communication channel 105 may be described by an operational mode. In some embodiments, the operational mode may be described by the IEEE 802.11ac specification, and may indicate a frequency bandwidth associated with the communication channel 105. For example embodiments described herein, the communication channel 105 may be approximately 160 MHz wide (e.g., and thus has a frequency bandwidth of 160 MHz), although for actual embodiments, the communication channel 105 may have other suitable frequency bandwidths.

The wireless devices 102 and 103 may also be described by an operational mode. For example, the wireless devices 102 and 103 may operate in an 80 MHz operating mode or in a 160 MHz operating mode. When the wireless devices 102 and 103 operate in the 160 MHz operating mode, transceiver chains (not shown for simplicity) within the wireless devices 102 and 103 may transmit and receive signals using an entire 160 MHz frequency band. Conversely, when the wireless devices 102 and 103 operate in the 80 MHz operating mode, each of the transceiver chains within the wireless devices 102 and 103 may transmit and receive signals within a corresponding 80 MHz frequency band.

To transmit and receive signals using the 160 MHz frequency band, the wireless devices 102 and 103 may use a first transceiver chain (not shown for simplicity) tuned to a first 80 MHz segment of the frequency band, and may use a second transceiver chain (not shown for simplicity) tuned to a second 80 MHz segment of the frequency band. This may allow the wireless devices 102 and 103 to utilize the entire 160 MHz bandwidth of communication channel 105 with transceivers having an 80 MHz tuning range (e.g., which may provide cost and/or performance benefits over transceivers having a 160 MHz tuning range).

Thus, for purposes of discussion herein, the communication channel 105 may be "divided" into two adjacent 80 MHz frequency segments, for example, in which a first frequency segment corresponds to a lower 80 MHz portion of the frequency band and a second frequency segment corresponds to an upper 80 MHz portion of the frequency band. As described in more detail below, a first set of one or more transceivers in wireless devices 102 and 103 may be configured to transmit and receive signals having frequencies within the first frequency segment, and a second set of one or more transceivers in wireless devices 102 and 103 may be configured to transmit and receive signals having frequencies within the second frequency segment. For other embodiments, the communication channel 105 may be divided into any suitable number of frequency segments, for example, based upon the tuning range of transceiver chains within the wireless devices 102 and 103.

FIG. 1B shows the example communication system 100 in the presence of a radar device 110. Although only one radar device 110 is shown for simplicity, the communication system 100 may include any number of radar devices. The radar device 110 is shown to transmit radar signals 150 that may be received by wireless device 102 (and also by wireless device 103). To preserve the integrity of radar signals 150, government regulations require wireless devices 102 and 103 to cease operations within the shared frequency band when radar signals 150 are present. Thus, it is important for wireless devices 102 and 103 to quickly detect radar signals 150 having frequency components that fall within the bandwidth of communication channel 105 (see also FIG. 1A).

As shown in FIG. 1B, the wireless device 102 may include a transceiver 120, radar detection logic 125, and a controller 130. The transceiver 120, which may include any suitable number of transceiver chains, may transmit and receive communication signals through the communication channel 105. The radar detection logic 125 may detect radar signals 150 having frequency components that fall within the frequency spectrum used by wireless device 102, and may generate a trigger signal (TRG) indicating whether such radar signals 150 are present. The controller 130 may control transmission operations of transceiver 120 based on the trigger signal TRG. For example, when the trigger signal TRG indicates that radar signals 150 are present, the controller 130 may instruct transceiver 120 through a control signal CTRL to stop transmitting Wi-Fi signals 140. Thereafter, when the trigger signal TRG indicates that radar signals 150 are no longer present (after a minimum non-occupancy period), the controller 130 may instruct transceiver 120 through the control signal CTRL to resume transmitting Wi-Fi signals 140. Although not shown for simplicity, the wireless device 103 may also include a transceiver and a controller similar to the transceiver 120 and the controller 130, respectively, of wireless device 102.

Figure 2:
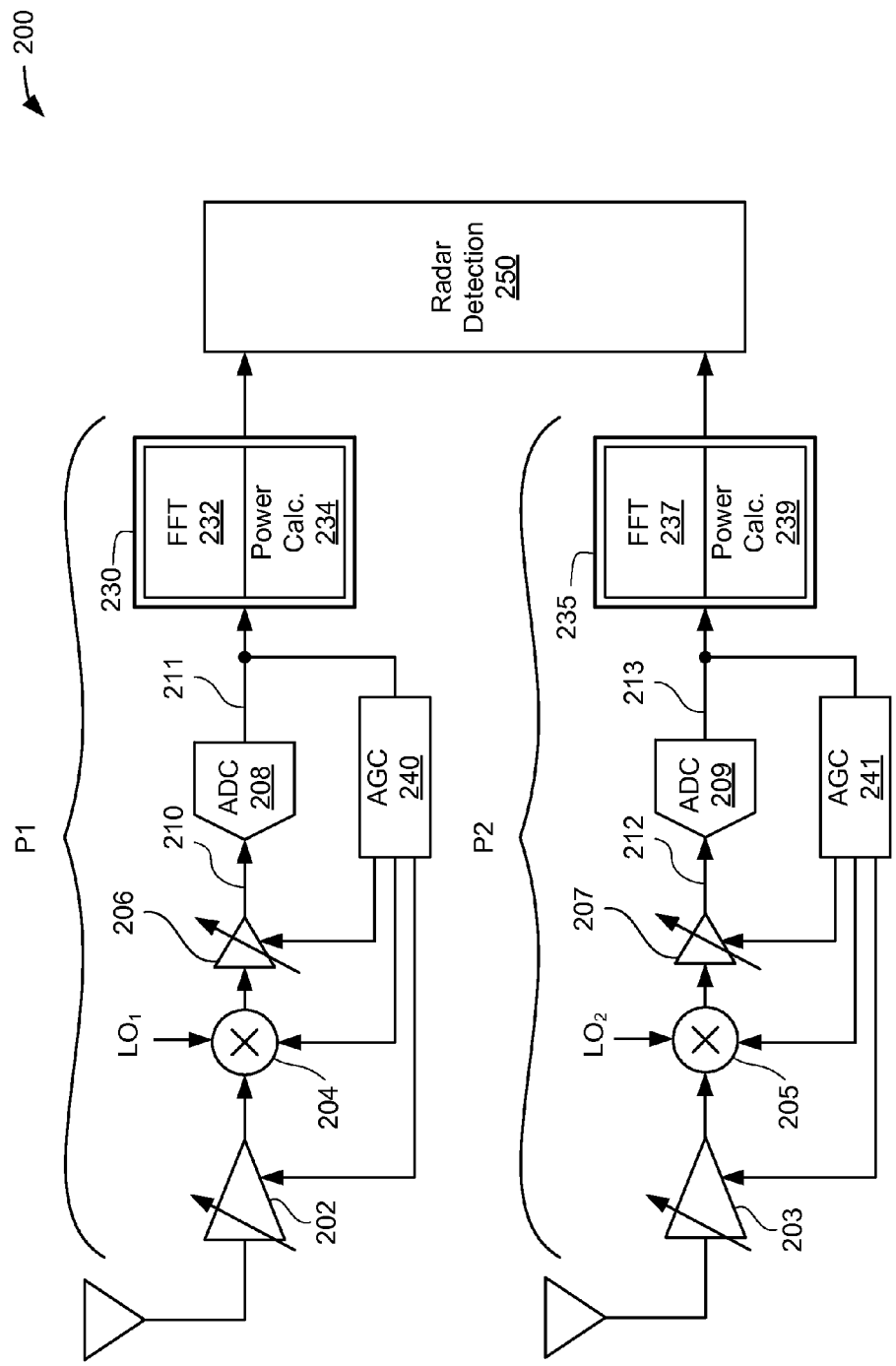
FIG. 2 is a block diagram of a first receiver, in accordance with example embodiments.

FIG. 2 is a block diagram of a first receiver 200, in accordance with example embodiments. The first receiver 200, which may be implemented within one or more transceiver chains of wireless devices 102 and 103, is shown to include a first processing path P1 and a second processing path P2. The first processing path P1 may receive signals within a first frequency segment. The first processing path P1 may include a low noise amplifier (LNA) 202, a mixer 204, an amplifier 206, an analog-to-digital converter (ADC) 208, a digital processing block 230, and an automatic gain controller (AGC) 240. The LNA 202 may receive and amplify a signal, such as the Wi-Fi signal 140 and/or the radar signal 150. The mixer 204 may "mix" together (e.g., multiply together two input signals) the amplified signal from the LNA 202 and a first local oscillator signal ($LO_1$). The amplifier 206 may scale an output signal from mixer 204 to generate a scaled down-converted receive signal 210.

The scaled down-converted receive signal 210 may be converted to a digital data signal 211 by the ADC 208.

The ADC 208 may be coupled to the AGC 240, which in turn is coupled to the LNA 202, the mixer 204, and the amplifier 206. The AGC 240 may adjust gain settings for the LNA 202, gain settings for the mixer 204, and/or gain settings for the amplifier 206 based, at least in part, on the digital data signal 211. For example, the AGC 240 may monitor the digital data signal 211 and, in response thereto, may increase or decrease a gain setting of the LNA 202, a gain setting of the mixer 204, and/or a gain setting of the amplifier 206 to "size" (e.g., scale) the scaled down-converted receive signal 210 for the ADC 208. If the AGC 240 determines that the scaled down-converted receive signal 210 is too large (e.g., saturating the ADC 208 and causing a distorted digital data signal 211), then the AGC 240 may reduce the gain settings for the LNA 202, the mixer 204, and/or the amplifier 206. If the AGC 240 determines that the scaled down-converted receive signal 210 is too small (e.g., not providing a significant input signal for the ADC 208 and causing a minimal digital data signal 211), then the AGC 240 may increase the gain settings for the LNA 202, the mixer 204, and/or the amplifier 206. In some embodiments, additional gain elements (not shown for simplicity) may be used within the first processing path P1 to modify a gain associated with the scaled down-converted receive signal 210. The additional gain elements may be controlled by the AGC 240.

The digital processing block 230 may receive the digital data signal 211 from the ADC 208. The digital processing block 230 may include a Fast Fourier Transform (FFT) block 232 and a power calculation block 234. The FFT block 232 may compute FFT output values (e.g., FFT bins) based on the digital data signal 211. In some embodiments, peak in-band FFT bins (e.g., in-band FFT bins having a peak magnitude) may be computed. The power calculation block 234 may determine an amount of in-band power and/or energy associated with the digital data signal 211 and/or with the FFT bins from FFT block 232. In some embodiments, the power calculation block 234 may determine an amount of out-of-band power and/or energy associated with the digital data signal 211 and/or the FFT bins from the FFT block 232. The in-band power or energy may refer to an amount of power or energy determined to be within a frequency segment of the communication channel 105 used by the first receiver 200. The out-of-band power or energy may refer to an amount of power or energy outside the frequency segment of the communication channel 105. In some embodiments, the power calculation block 234 may include a configurable digital filter (not shown for simplicity) to remove the out-of-band signal components from the digital data signal 211 and/or out-of-band FFT bins prior to determining the in-band power and/or energy. For example, the power calculation block 234 may include a configurable finite impulse response (FIR) or infinite impulse response (IIR) digital filter to remove the out-of-band signal components and/or out-of-band FFT bins before determining the in-band power. The FFT bins from the FFT block 232, including peak FFT bins, and power information from the power calculation block 234 may be used to determine if the radar signal 150 is present within the communication channel 105.

As described above with respect to FIGS. 1A and 1B, in some operational modes, the communication channel 105 may include two or more adjacent frequency segments. In some embodiments, the second processing path P2 may receive signals having frequencies within the second frequency segment. The second processing path P2 may include an LNA 203, a mixer 205, an amplifier 207, an ADC 209, an AGC 241, and a digital processing block 235. Similar to the first processing path P1, the LNA 203 may receive and amplify the Wi-Fi signal 140 and/or the radar signal 150. The mixer 205 may mix together the amplified signal from the LNA 203 and a second local oscillator signal ($LO_2$). The amplifier 207 may scale an output signal from the mixer 205 to generate a scaled down-converted receive signal 212. The scaled down-converted receive signal 212 may be received by the ADC 209 and converted to a digital data signal 213.

The ADC 209 may be coupled to AGC 241, which in turn may be coupled to the LNA 203, the mixer 205, and the amplifier 207. In a similar manner as described above with respect to the first processing path P1, the AGC 241 may adjust gain settings for the LNA 203, gain settings for the mixer 205, and or gain settings for the amplifier 207 based, at least in part, on the digital data signal 213. The digital processing block 235 may receive the digital data signal 213 from the ADC 209. The digital processing block 235 may include an FFT block 237 and a power calculation block 239. The FFT block 237 may compute FFT bins based on the digital data signal 213. The power calculation block 239 may determine an amount of in-band power or energy and/or an amount of out-of-band power or energy associated with the digital data signal 213 and/or with the FFT bins from the FFT block 237.

The first frequency segment and the second frequency segment may be adjacent (in frequency) to each other. For example, a first frequency segment occupying frequencies between 5240 MHz-5280 MHz may be adjacent to a second frequency segment occupying frequencies between 5280 MHz and 5320 MHz. Although not shown for simplicity, the first and second processing paths P1 and P2 may also process quadrature signals. For example, processing paths P1 and P2 may include two distinct paths for processing an in-phase signal and a quadrature signal. The in-phase signal may be based on a local oscillator signal while the quadrature signal may be based on a 90 degree phase-shifted version of the local oscillator signal. Further, although only two processing paths P1 and P2 are depicted in FIG. 2 for simplicity, other embodiments may include any number of processing paths.

The radar detection block 250 may be coupled to the digital processing blocks 230 and 235. The radar detection block 250, which may be one embodiment of the radar detection logic 125 of FIG. 1B, may search for and detect the radar signal 150 within the frequency segments associated with the communication channel 105.

In some embodiments, a search for a radar signal may be triggered when the radar detection block 250 detects a strong signal event within the communication channel 105. A strong signal event may indicate the presence of a radar signal. For example, a strong signal event may occur when the LNA 202 and/or the LNA 203 is saturated. When the LNA 202 and/or the LNA 203 are saturated, the digital data signals 211 and 213, respectively, may be distorted. As described above, the AGC 240 may adjust the gain setting of the LNA 202 in response to a distorted digital data signal 211. Similarly, the AGC 241 may adjust the gain setting of the LNA 203 in response to a distorted digital data signal 213. Therefore, in some embodiments, the radar detection block 250 may receive a signal from the AGC 240 and/or AGC 241 to indicate a strong signal event.

The radar detection block 250 may determine which of the processing paths P1 and P2 may be associated with the strong signal event, and therefore within which associated frequency segment to search for the radar signal 150. In some embodiments, the frequency segments may be contiguous or substantially contiguous. In those embodiments, radar signals 150, such as chirping radar signals, may appear within two adjacent frequency segments. Thus, in response to the strong signal event, the radar detection block 250 may search for the radar signal 150 within the one or two frequency segments. Searching for radar signals 150 is described in more detail below in conjunction with FIGS. 3-13.

Figure 3:
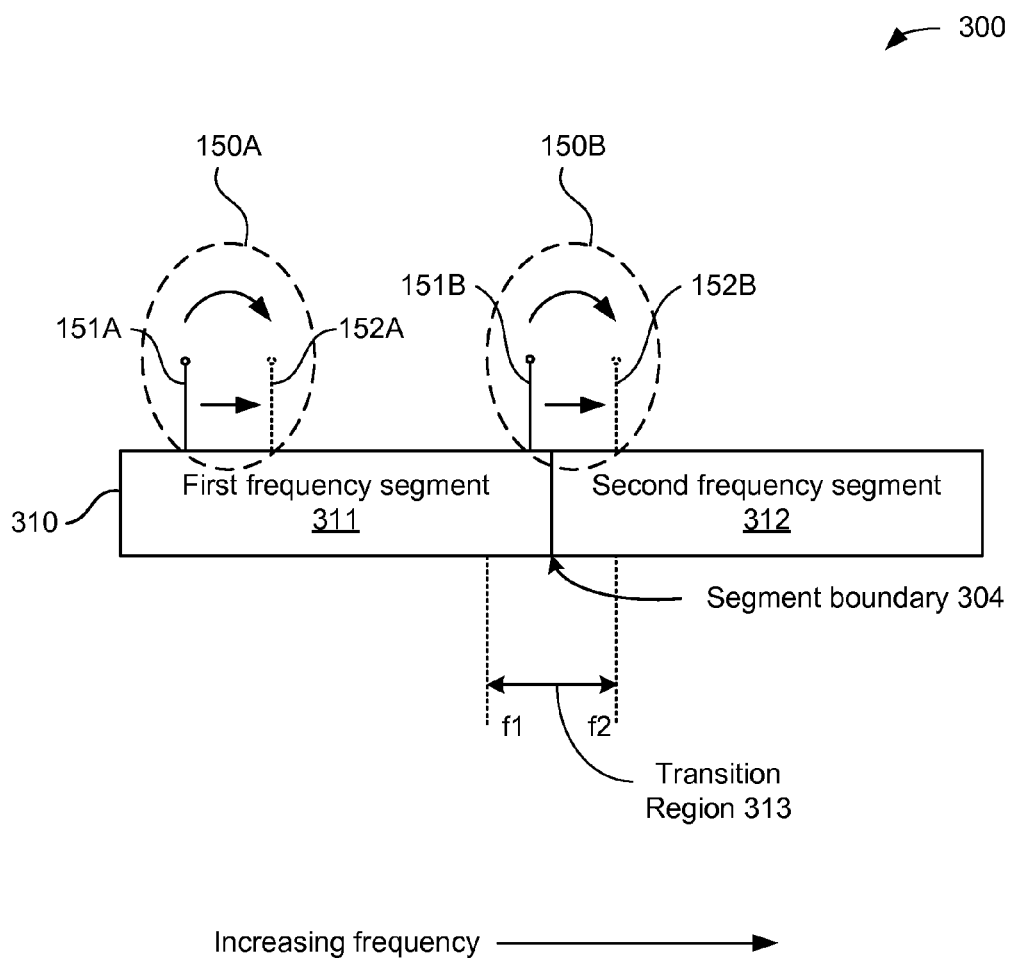
FIG. 3 is a diagram depicting an example embodiment of a communication channel divided into two adjacent frequency segments.

FIG. 3 is a diagram 300 depicting an example embodiment of a communication channel 310 divided into two adjacent frequency segments 311 and 312. The communication channel 310 may be an embodiment of the communication channel 105 of FIG. 1A. The first processing path P1 may be configured to receive and process signals within the first frequency segment 311 and the second processing path P2 may be configured to receive and process signals within the second frequency segment 312.

In one embodiment, the communication channel 310 may be 160 MHz wide, and may be divided into the first frequency segment 311 and the second frequency segment 312. Thus, the first frequency segment 311 and the second frequency segment 312 may each be 80 MHz wide. In other embodiments, the communication channel 310 may be 80 MHz wide, 40 MHz wide, or any other technically feasible frequency bandwidth. Moreover, the communication channel 310 may be divided into any technically feasible number of frequency segments having any technically feasible bandwidth.

In some embodiments, a variable frequency (e.g., chirping) radar signal may remain within a single frequency segment. For example, a first chirping radar signal 150A (which may be an embodiment of the radar signal 150 shown in FIG. 1B) may have an initial frequency 151A and a terminal frequency 152A. The initial frequency 151A of the first chirping radar signal 150A may be low enough (in the case of an increasing frequency chirping radar signal) that the first chirping radar signal 150A remains substantially within the first frequency segment 311. Thus, although the frequency of the first chirping radar signal 150A increases to the terminal frequency 152A, the first chirping radar signal 150A does not cross a segment boundary 304 and enter the second frequency segment 312. In this example, the wireless device 102 may search for the first chirping radar signal 150A by searching within the first frequency segment 311 (e.g., using a single corresponding transceiver chain).

In other embodiments, a chirping radar signal may transition between adjacent frequency segments. For example, a second chirping radar signal 150B (which may be another embodiment of the radar signal 150 shown in FIG. 1B) may have an initial frequency 151B and a terminal frequency 152B. In this example, the initial frequency 151B may be near the segment boundary 304 between the first frequency segment 311 and the second frequency segment 312 (e.g., may be within a transition region 313). The terminal frequency 152B may be in the second frequency segment 312. In this example, wireless device 102 may search for the chirping radar signal 150B by initially searching within the first frequency segment 311 (e.g., using a first transceiver chain configured for the first frequency segment 311) and then subsequently searching within the second frequency segment 312 (e.g., using a second transceiver chain configured for the second frequency segment 312).

In some embodiments, the transition region 313 may include a predetermined range of frequencies within which a chirping radar signal may be expected to transition into an adjacent frequency segment. For example, if the chirping radar signal is initially detected (e.g., has an initial frequency between frequencies f1 and f2) within the transition region 313, then the chirping radar signal may be expected to transition to the adjacent frequency segment. In some embodiments, the bandwidth of the transition region 313 may be associated with a bandwidth of a chirping radar signal. As depicted in FIG. 3, the transition region 313 may extend to either side of the segment boundary 304.

In other embodiments, a chirping radar signal may decrease in frequency. For example, a chirping radar signal may begin within the second frequency segment 312 and may end within the first frequency segment 311. The features provided in the disclosure are equally applicable to these embodiments as would be understood by persons of ordinary skill in the art. For example, if an initial frequency of a chirping radar signal is within the transition region 313 and within the second frequency segment 312, then a decreasing frequency chirping radar signal may transition to the first frequency segment 311.

Figure 4:
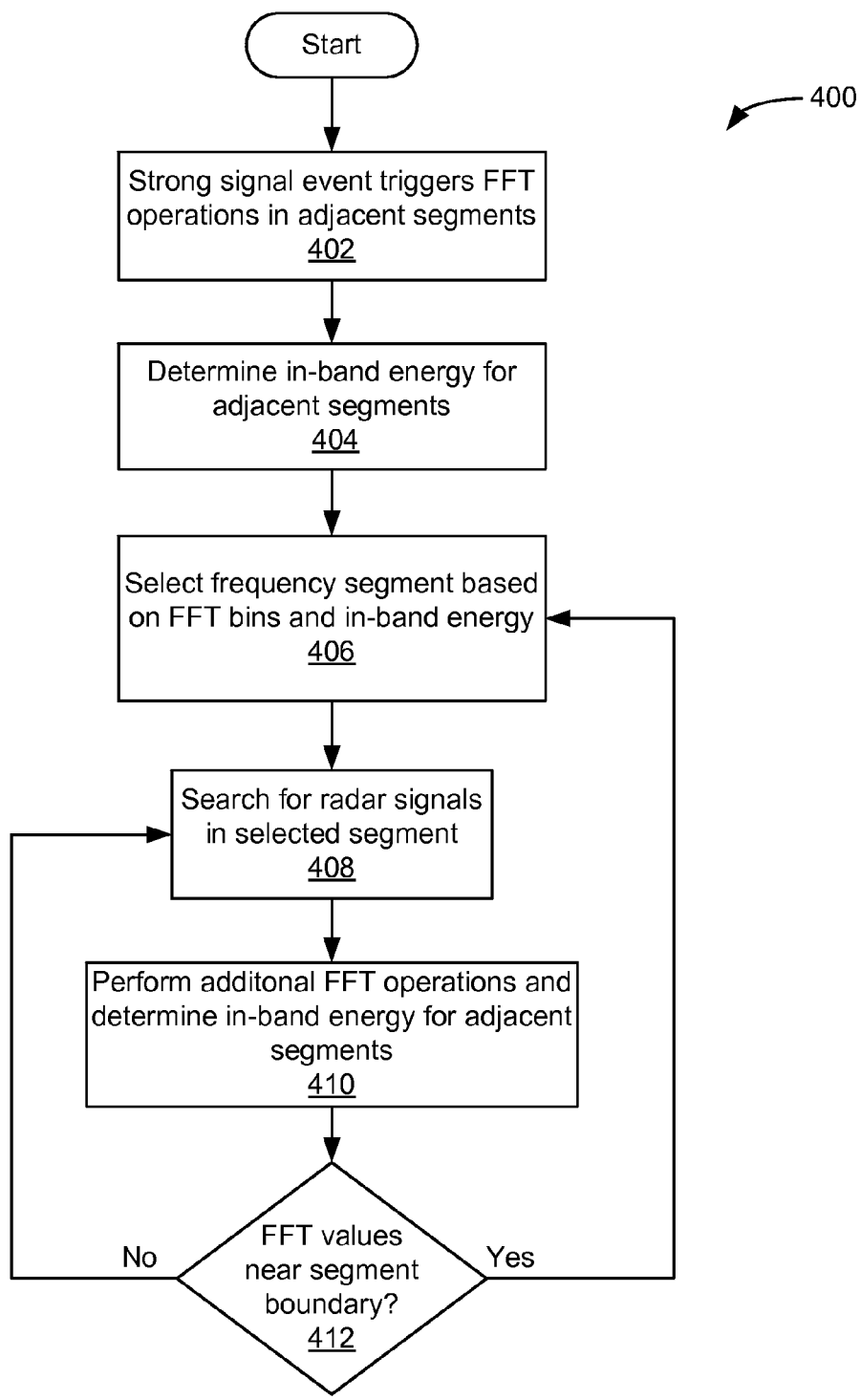
FIG. 4 is a flowchart depicting a first example operation for searching for radar signals.

FIG. 4 is a flowchart depicting a first example operation 400 for searching for radar signals. The examples described herein are not meant to be exhaustive or limiting, but rather illustrative in nature. Some embodiments may perform the operations described herein with additional operations, fewer operations, operations in a different order, operations in parallel, and/or some operations differently. Moreover, a source operation of an arrow may indicate that the target operation of the arrow is a subset of the source operation. Alternately, the arrow may indicate that the target operation is performed subsequent to the source operation or that the target operation is based on or in response to the source operation. These and other relationships among the operations will be understood by persons of ordinary skill in the art in accordance with the descriptions provided with the flowcharts.

For some embodiments, operation 400 may be performed by the wireless device 102. Referring also to FIGS. 1-3, a strong signal event triggers FFT operations on signals received within adjacent frequency segments (402). For example, a strong signal event may be detected by the AGC 240 and/or the AGC 241. In some embodiments, the first processing path P1 may be configured to receive signals within the first frequency segment 311, and the second processing path P2 may be configured to receive signals within the second frequency segment 312. Thus, the strong signal event may cause FFT bins to be determined by FFT block 232 and FFT block 237.

Next, in-band energy associated with the signals received within the adjacent frequency segments is determined (404). For example, the power calculation block 234 may determine an in-band power and/or energy amount associated with signals received within the first frequency segment 311, and the power calculation block 239 may determine an in-band power and/or energy amount associated with signals received within the second frequency segment 312. In some embodiments, the power calculation blocks 234 and 239 may include a configurable digital filter to limit the bandwidth of incoming signals to in-band frequencies. In still other embodiments, the power calculation blocks 234 and 239 may use gain settings associated with the LNA 202 and/or the LNA 203 to determine in-band power and/or energy. For example, in-band power calculations may be normalized with respect to the respective LNA gain settings.

Next, a frequency segment is selected to search for radar signals based, at least in part, on FFT bins and determined in-band power and/or energy (406). For example, due to the presence of the FFT bins and in-band power, a frequency segment may include the radar signal 150. Thus, the frequency segment associated with the FFT bins (determined at 402) and having a relatively large amount of in-band power and/or energy (determined at 404) may be selected. In other embodiments, the frequency segment associated with peak in-band FFT bins may be selected to search for radar signals. Next, radar signals are searched for within the selected frequency segment (408). In some embodiments, characteristics of the received signal (e.g., signal periodicity, duration, etc.) may be used to determine if the radar signal 150 is present within the selected frequency segment.

Next, additional FFT operations are performed and in-band power and/or energy is determined for the adjacent frequency segments (410). In some embodiments, the additional FFT operations associated with the first frequency segment 311 and the second frequency segment 312 may occur after a gain adjustment is performed by the AGC 240 and/or the AGC 241. In other embodiments, the additional FFT operations may be periodic. In-band power and/or energy may be determined at substantially the same time as the additional FFT operations are performed. The additional FFT operations may generate additional FFT bins. In some embodiments, one or more peak in-band FFT bins, associated with the additional FFT operations, may be determined.

Next, the wireless device 102 determines if the additional FFT bins associated with the additional FFT operations are near the segment boundary 304 (412). For example, the wireless device 102 may determine that the additional FFT bins and/or peak in-band FFT bins are near the segment boundary 304 when the additional FFT bins are within the transition region 313. In some embodiments, the wireless device 102 may determine that the additional FFT bins are near the segment boundary 304 when the additional FFT bins are within a threshold amount (e.g., within a predetermined frequency range) of the segment boundary 304. If the additional FFT bins are near the segment boundary 304, then operations proceed to 406. For example, additional FFT bins near the segment boundary 304 may indicate that a chirping radar signal may transition from a first frequency segment to a second frequency segment. By proceeding to 406, a new frequency segment may be selected to search for radar signals based on the additional FFT bins and determined in-band power and/or energy.

If the additional FFT bins are not near the segment boundary 304, then operations proceed to 408. Since the additional FFT bins are not near the segment boundary 304, then a chirping radar signal, if present, would not transition from the currently selected frequency segment to another frequency segment. Thus, the previously selected frequency segment may be used to search for radar signals.

In some embodiments, the wireless device 102 may also determine if a chirping radar signal may increase or decrease in frequency. For example, the wireless device 102 may determine that a chirping radar signal is decreasing in frequency (chirping downward) based on associated FFT bins. Knowing a possible increase or decrease in frequency may aid in determining whether to select a new frequency segment (in 406) or remain within the selected frequency segment (in 408). For example, if FFT bins are determined to be within the first frequency segment 311 and within transition region 313, and the chirping radar signal is determined to decrease in frequency, then the second frequency segment 312 would not be selected to search for the radar signal 150 (e.g., because a chirping radar signal that decreases in frequency would not move up to a higher frequency segment). In a similar manner, if the FFT bins are within the second frequency segment 312 and within the transition region 313, and the chirping radar signal is determined to increase in frequency, then the first frequency segment 311 would not be selected to search for the radar signal 150.

In some embodiments, searching for radar signals within frequency segments may be simplified by using over-sampled data. For example, the ADCs 208 and 209 may operate with an oversampled (e.g., twice the Nyquist rate) clock signal and may provide the digital data signals 211 and 213 with out-of-band data. Thus, the digital data signals 211 and 213 may be used to search for chirping radar signals when, for example, FFT bins are near the segment boundary 304. Using out-of-band data to search for radar signals is described in more detail below in conjunction with FIGS. 5 and 6.

Figure 5:
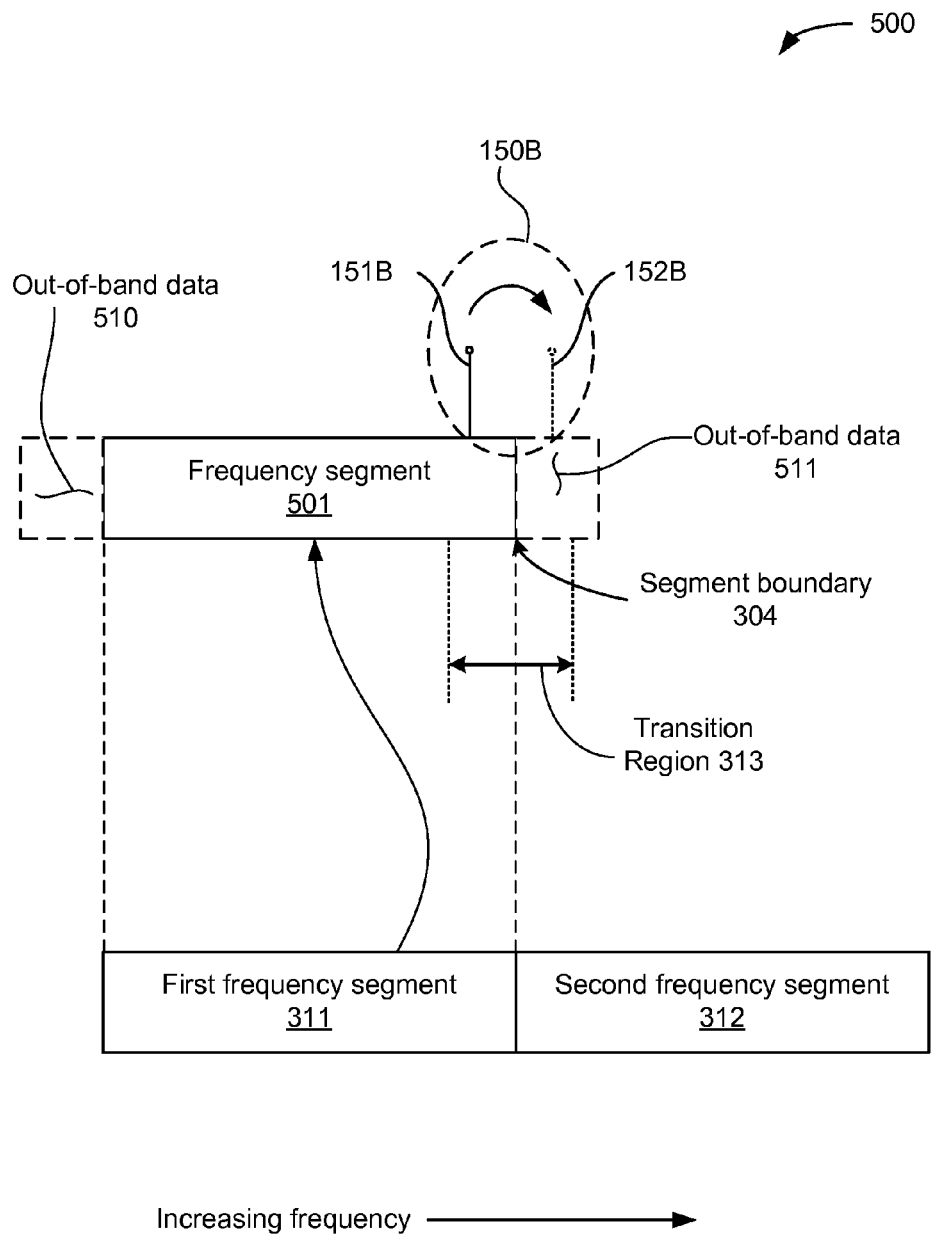
FIG. 5 is a diagram depicting an example embodiment of a frequency segment.

FIG. 5 is a diagram 500 depicting an example embodiment of a frequency segment 501. Using out-of-band data from an ADC may enable FFT bins to be generated and an associated power and/or energy determined for out-of-band data regions 510 and 511. The out-of-band FFT bins and power may, in turn, be used to search for chirping radar signals as they transition beyond the segment boundary 304. For example, the chirping radar signal 150B may have an initial frequency 151B within the frequency segment 501 and within the transition region 313. Instead of searching for radar signals within an adjacent frequency segment, wireless device 102 may use out-of-band data 511 to search for the radar signals. In some embodiments, the out-of-band data 510 and 511 may be provided by oversampling performed by an associated ADC. Thus, if the associated ADC is 2 times oversampled and the associated frequency segment 501 is 80 MHz wide, then the out-of-band data 510 and 511 may be 80 MHz wide in total (e.g., out-of-band data 510 and 511 may each be 40 MHz wide). In other embodiments, the frequency segment 501 and out-of-band data 510 and 511 may have other bandwidths.

The frequency segment 501 may be another embodiment of the first frequency segment 311 or the second frequency segment 312. In some embodiments, if the frequency segment 501 is another embodiment of the first frequency segment 311 (e.g., the frequency segments 501 and 311 share common frequencies as shown with dashed lines), then out-of-band data 511 may extend into frequencies shared in common with the second frequency segment 312. In a similar manner, if frequency segment 501 is another embodiment of second frequency segment 312, then out-of-band data 510 may extend into frequencies shared in common with the first frequency segment 311 (not shown for simplicity).

Figure 6:
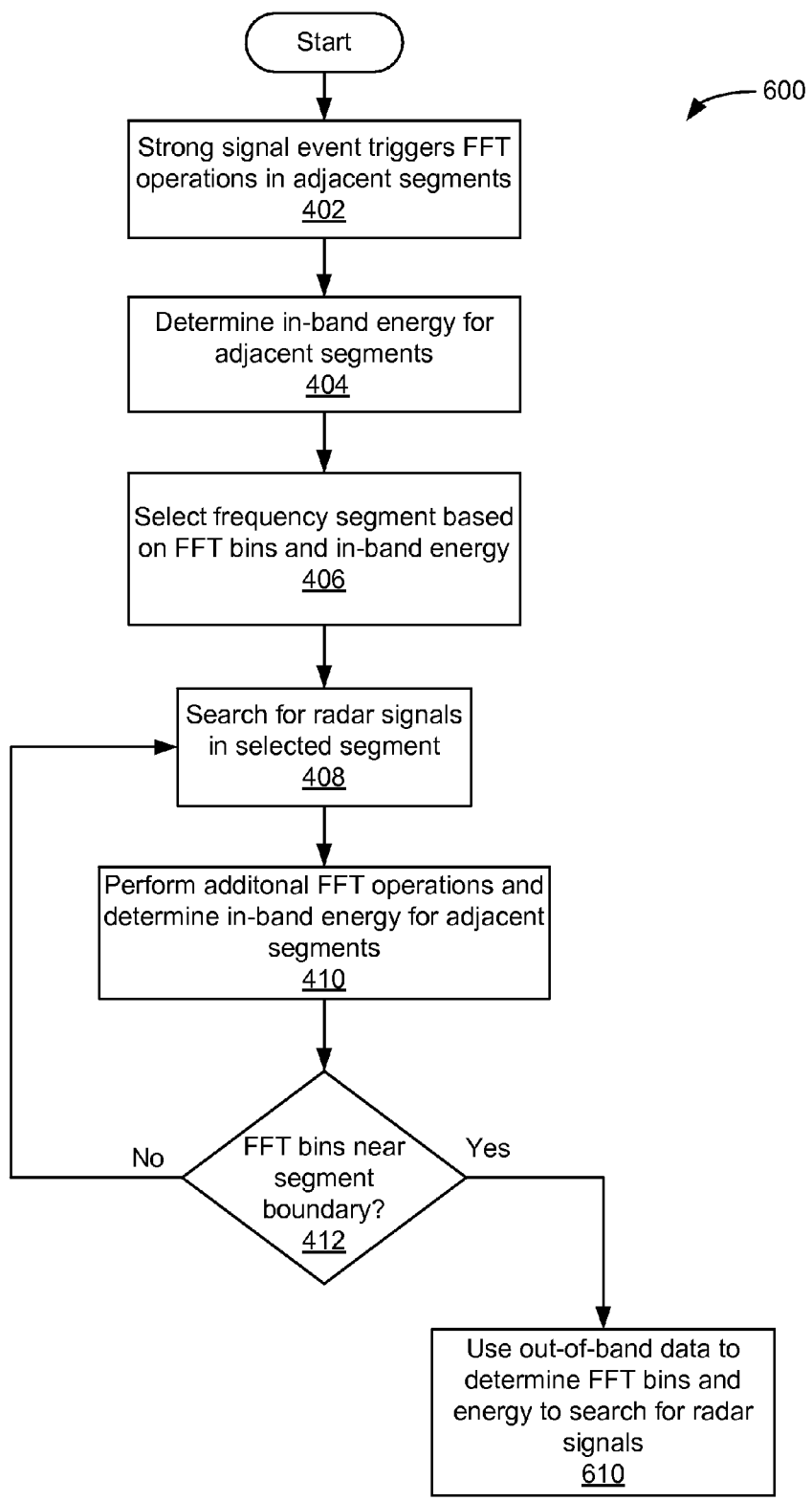
FIG. 6 is a flowchart depicting a second example operation for searching for radar signals.

FIG. 6 is a flowchart depicting a second example operation 600 for searching for radar signals. Referring also to FIGS. 2, 4, and 5, a strong signal event triggers FFT operations on signals received within adjacent frequency segments (402). Next, in-band energy associated with the received signals within the adjacent frequency segments is determined (404). Next, a frequency segment is selected based on the FFT bins and the determined in-band power and/or energy (406). Next, radar signals are searched for within the selected frequency segment (408). Next, additional FFT operations are performed and in-band power and/or energy is determined for the adjacent frequency segments (410). Next, the wireless device 102 determines if the additional FFT bins associated with the additional FFT operations are near the segment boundary 304 (412). Operations 402, 404, 406, 408, 410, and 412 may be substantially similar to similarly numbered operations described above with respect to FIG. 4.

If the FFT bins (determined in 410) are not near the segment boundary 304 (e.g., not within the transition region 313), then operations proceed to 408 and radar signals are searched for within the selected frequency segment. For example, the FFT bins may not be close to the segment boundary 304, and thus radar signals may be searched for within the segment selected at 408.

If the FFT bins are near the segment boundary 304, then wireless device 102 may use out-of-band data to determine FFT bins and determine out-of-bound power and/or energy to search for radar signals (610). For example, if FFT bins are located within the first frequency segment 311 and are also within transition region 313 between the first frequency segment 311 and the second frequency segment 312, then the out-of-band data 511 may be used to search for radar signals. Thus, out-of-band data 510 and/or 511 may be used to determine FFT bins within an adjacent frequency segment and determine in-band power and/or energy associated with the adjacent frequency segment.

In some embodiments, determining power and/or energy associated with out-of-band data 510 and/or 511 may include modifying coefficients of the digital filter included within power calculation blocks 234 and 239. For example, if a digital filter rejects out-of-band signals for the power calculation blocks 234 and 239 when determining in-band power and/or energy, then the digital filter may be modified to allow out-of-band signals when determining power and/or energy associated with out-of-band signals.

In a similar manner, FFT bins that were previously considered out-of-band may now be considered in-band when searching for radar signals at 610. If the out-of-band data 511 extends 20 MHz beyond the frequency segment 501, in-band limits associated with FFT bins may also be extended by 20 MHz. In some embodiments, using the out-of-band data 510 and 511 may also be determined by the radar signal 150. If the radar signal 150 is a decreasing frequency radar signal, then out-of-band data 510 may be used since the radar signal 150 may decrease from the frequency segment 501 into the out-of-band data 510. On the other hand, if the radar signal 150 is an increasing frequency radar signal, then out-of-band data 511 may be used since the radar signal 150 may increase from the frequency segment 501 into the out-of-band data 511.

In some embodiments, FFT bins from the first processing path P1 and the second processing path P2 may be "stitched" together to generate an FFT output that appears to have been generated by a single FFT operation. For example, when the first frequency segment 311 is 80 MHz wide, and the second frequency segment 312 is also 80 MHz wide, then the FFT bins from the first frequency segment 311 and the second frequency segment 312 may be combined to create FFT bins that appear to be associated with an FFT operation on a contiguous 160 MHz frequency segment. This approach is described in more detail in conjunction with FIGS. 7, 8, and 9.

Figure 7:
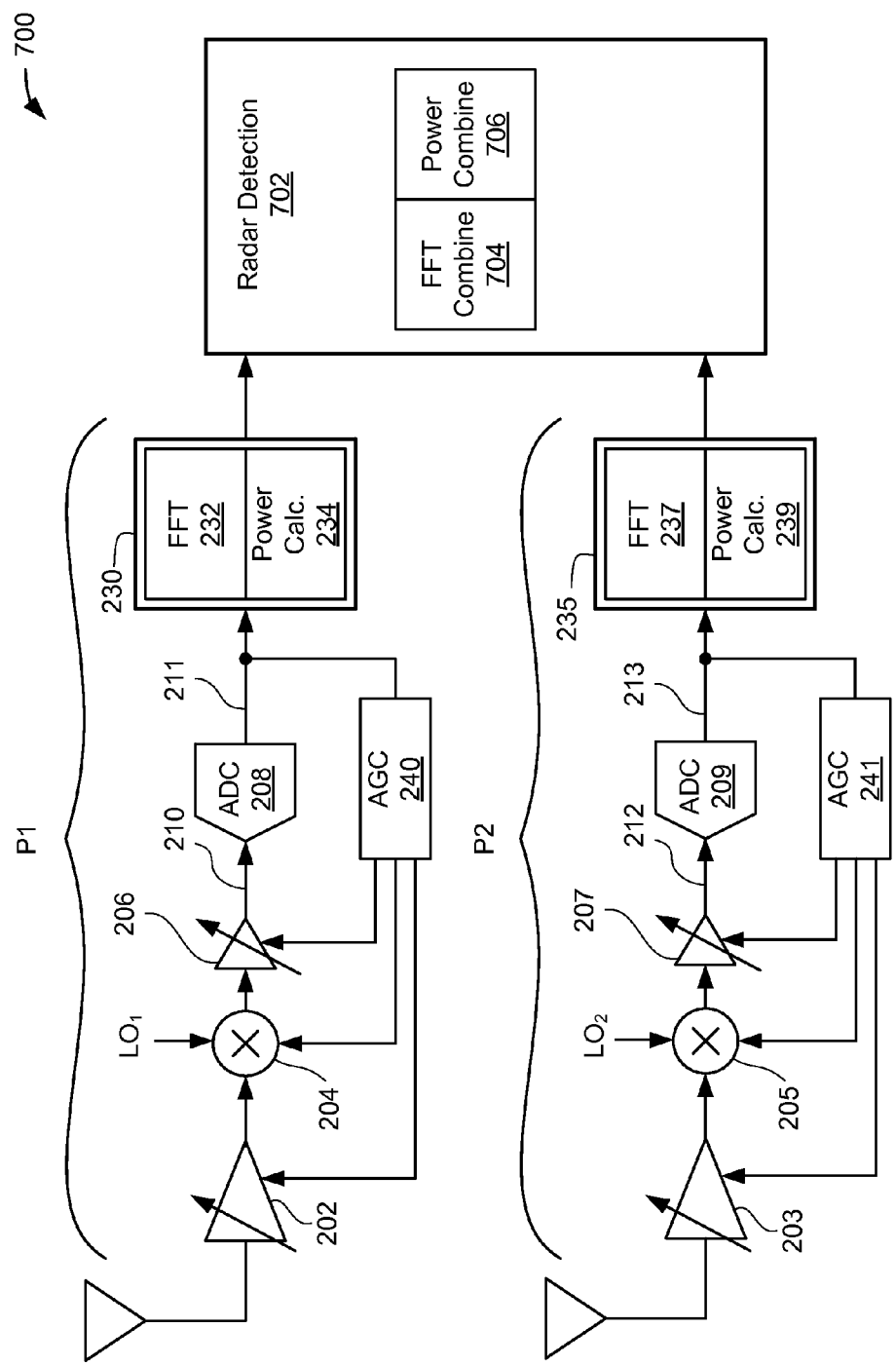
FIG. 7 is a block diagram of a second receiver, in accordance with example embodiments.

FIG. 7 is a block diagram of a second receiver 700, in accordance with example embodiments. Similar to the first receiver 200 of FIG. 2, the receiver 700 may include the first processing path P1 and the second processing path P2. The first processing path P1 may include similar elements as those shown in FIG. 2. For example, the first processing path P1 may include the LNA 202, the mixer 204, the amplifier 206, the ADC 208, the AGC 240, and the digital processing block 230. The amplifier 206 may generate the scaled down-converted receive signal 210 and the ADC 208 may generate the digital data signal 211. In a similar manner, the second processing path P2 may include the LNA 203, the mixer 205, the amplifier 207, the ADC 209, the AGC 241, and the digital processing block 235. The amplifier 207 may generate the scaled down-converted receive signal 212 and the ADC 209 may generate the digital data signal 213. Both the digital processing block 230 and the digital processing block 235 may be coupled to a radar detection block 702.

The radar detection block 702 may receive FFT bins from the FFT block 232 and the FFT block 237. The FFT bins may be stitched together (e.g., combined) by an FFT combine block 704. In some embodiments, the FFT bins from the FFT block 232 and the FFT block 237 may be combined to generate FFT bins that may span the combined bandwidth of the first processing path P1 and the second processing path P2. Thus, when the first processing path P1 and the second processing path P2 are configured to process 80 MHz of bandwidth, the FFT bins from the respective processing paths may be combined to span 160 MHz of bandwidth. In other embodiments, the bandwidth of the first processing path P1 and the second processing path P2 may be any technically feasible bandwidth. In some embodiments, the FFT bins may be scaled with respect to gain settings associated with the LNA 202 and the LNA 203. In other embodiments, inputs to the FFT block 232 and the FFT block 237 may be scaled by a ratio determined by an amplitude of the scaled down-converted receive signal 210 and an amplitude of the scaled down-converted receive signal 212. In this manner, the magnitude of the FFT bins from each processing path may be adjusted so that the FFT bins from separate processing paths may be evenly combined. For example, the FFT bins from the first processing path P1 may have the same magnitude as FFT bins from the second processing path P2 in response to a similar received signal. In other embodiments, clock rates associated with the FFT block 232 and the FFT block 237 may be adjusted to be consistent with the bandwidth of the combined frequency segments.

The radar detection block 702 may receive power and/or energy data from the power calculation block 234 and the power calculation block 239. The power and/or energy data may be combined together by a power combine block 706. As described above, power and/or energy data from the power calculation block 234 and from the power calculation block 239 may be scaled with respect to gain settings associated with the first processing path P1 and/or the second processing path P2. In this manner, the power and/or energy data from each processing path may be adjusted so that the power and/or energy data may be evenly combined. For example, power and/or energy data from the first processing path P1 and the second processing path P2 may be adjusted to have similar values in response to similar received signals. As described above, in some embodiments, the power calculation blocks 234 and 239 may include one or more digital filters to remove out-of-band signal components from the respective digital data signal. Since out-of-band signals are removed from the digital data signal, the resulting power and/or energy data determined by the power calculation block 234 will not overlap with power and/or energy determined by the power calculation block 239. The FFT bin combining and power and/or energy data combining is described in more detail below in conjunction with FIGS. 9 and 10.

Figure 8:
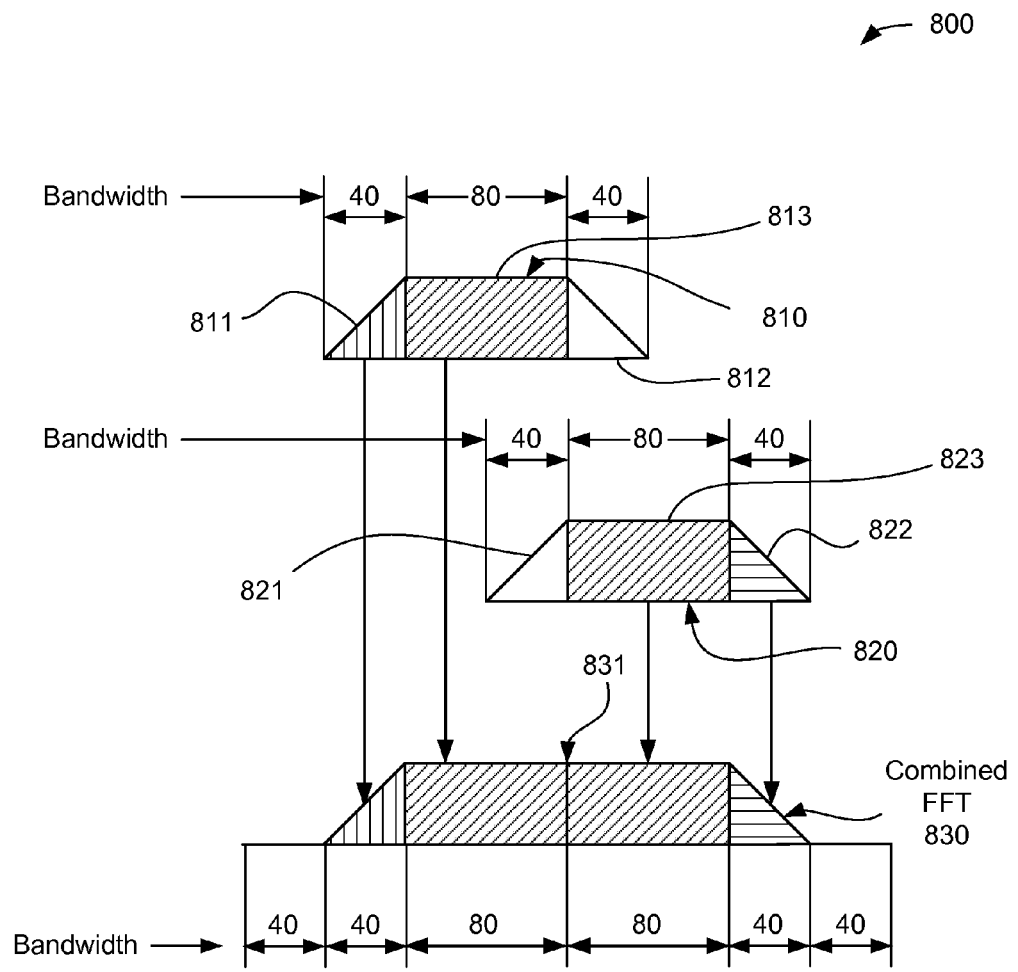
FIG. 8 is a simplified diagram depicting combining FFT bins from a first processing path and a second processing path to generate a combined FFT output.

FIG. 8 is a simplified diagram 800 depicting combining FFT bins from the first processing path P1 and the second processing path P2 to generate a combined FFT output 830.

FFT bins associated with the first processing path P1 are shown with FFT bins 810. In one embodiment, the first processing path P1 may be 80 MHz wide, and thus in-band FFT bins 813 may also be 80 MHz wide. Because FFT bins 810 may be generated based on an oversampled clock frequency (in this example, a 160 MHz clock frequency), the FFT bins 810 may also include out-of-band bins before and after the in-band frequency bins. For example, out-of-band FFT bins 811 and 812 may be included before and after the 80 MHz in-band FFT bins 813. In addition, the out-of-band FFT bins 811 and 812 may each have a bandwidth of 40 MHz. In a similar manner, FFT bins 820 from the second processing path P2 may include 80 MHz of in-band FFT bins 823. Out-of-band FFT bins 821 and 822 may also be included before and after the in-band FFT bins 823.

In some embodiments, the first processing path P1 and the second processing path P2 may have bandwidths other than 80 MHz. For example, if the first processing path P1 and the second processing path P2 have 40 MHz bandwidths, then in-band FFT bins 813 and 823 may also be 40 MHz wide. In still other embodiments, the bandwidth of the first processing path P1 may be different from the bandwidth of the second processing path P2. For example, the bandwidth of the first processing path P1 may be 80 MHz and the bandwidth of the second processing path P2 may be 40 MHz. Thus, the in-band FFT bins 813 may be 80 MHz wide and the in-band FFT bins 823 may be 40 MHz wide.

Although the in-band FFT bins 813 and 823 may be used to generate combined FFT output 830, in some other embodiments, overlapping out-of-band FFT bins may be excluded from the combined FFT output 830. For example, the out-of-band FFT bins 812 and 821 may be excluded from the combined FFT output 830. In some embodiments, the out-of-band FFT bins that do not overlap may be appended to either side of the in-band FFT bins 813 and 823. Thus, the out-of-band FFT bins 811 and 822 may be included in combined FFT output 830. In some embodiments, the in-band FFT bins 813 and 823 may be separated by a frequency gap, such as a 5 MHz frequency gap. The combined FFT output 830 may include the in-band FFT bins 813 and the in-band FFT bins 823 and the frequency gap.

The combined FFT output 830 may include an FFT bin 831 that may be centrally located within the combined FFT output 830 such that the FFT bin 831 may be provided by the in-band FFT bins 813 (e.g., a FFT bin from the end of the in-band FFT bins 813) or by the in-band FFT bins 823 (e.g., an FFT bin from the beginning of the in-band FFT bins 823). In some embodiments, the FFT bin 831 may be selected from the in-band FFT bins 813 or 823 in accordance with an associated power, energy, or a peak FFT bin value. For example, if the in-band FFT bins 813 have more in-band power and/or energy than the in-band FFT bins 823, then the FFT bin 831 may be provided by the in-band FFT bins 813. In other embodiments, the FFT bin 831 may be an average of FFT bins (e.g., an average FFT bin value) from both the in-band FFT bins 813 and 823. In still other embodiments, the FFT bin 831 may be selected from a predetermined processing path.

As described above, FFT bins may include out-of-band FFT bins when, for example, the FFT bins are based on an oversampled clock rate. For example, if FFT bins 810 are based on a 160 MHz clock frequency, in-band FFT bins 813 may have an 80 MHz bandwidth while the out-of-band FFT bins 811 and 812 may each have a 40 MHz bandwidth. In a similar manner, if the combined FFT output 830 has a 160 MHz bandwidth (e.g., two adjacent 80 MHz frequency segments), then the bandwidth of the combined FFT output 830 (including out-of-band FFT bins) should be 320 MHz wide. Since the in-band FFT bins 813 and 823, and out-of band FFT bins 811 and 822 only correspond to 240 MHz, 80 MHz of additional FFT bins may be included with combined FFT output 830. However, the additional FFT bins are out-of-band FFT bins, and may not be used to search for radar signals. Thus, the value of the additional 80 MHz FFT bins may be zero. This is illustrated in diagram 800 with 40 MHz of zero-valued FFT bins appended to either end (e.g., adjacent to frequency ranges above and below) of the combined FFT output 830.

In some embodiments, FFT bins 810 may be scaled with respect to gain settings associated with the LNA 202. In a similar manner, FFT bins 820 may be scaled with respect to gain settings associated with the LNA 203. In some embodiments, the scaled down-converted receive signal 210 and/or the scaled down-converted receive signal 212 may be scaled to control the magnitude of the in-band FFT bins 813 and 823 so that the FFT bins may be evenly combined. For example, the FFT bins associated with the first processing path P1 may be controlled to have the same magnitude as FFT bins associated with the second processing path P2 in response to a similar received signal. In some embodiments, operations of the LNA 202 and the LNA 203 may be linked together when combining FFT bins. For example, gain settings of the LNA 202 may be linked to the LNA 203 to ensure that FFT bins 810 and FFT bins 820 may have a similar magnitude in response to similar signals.

Figure 9:
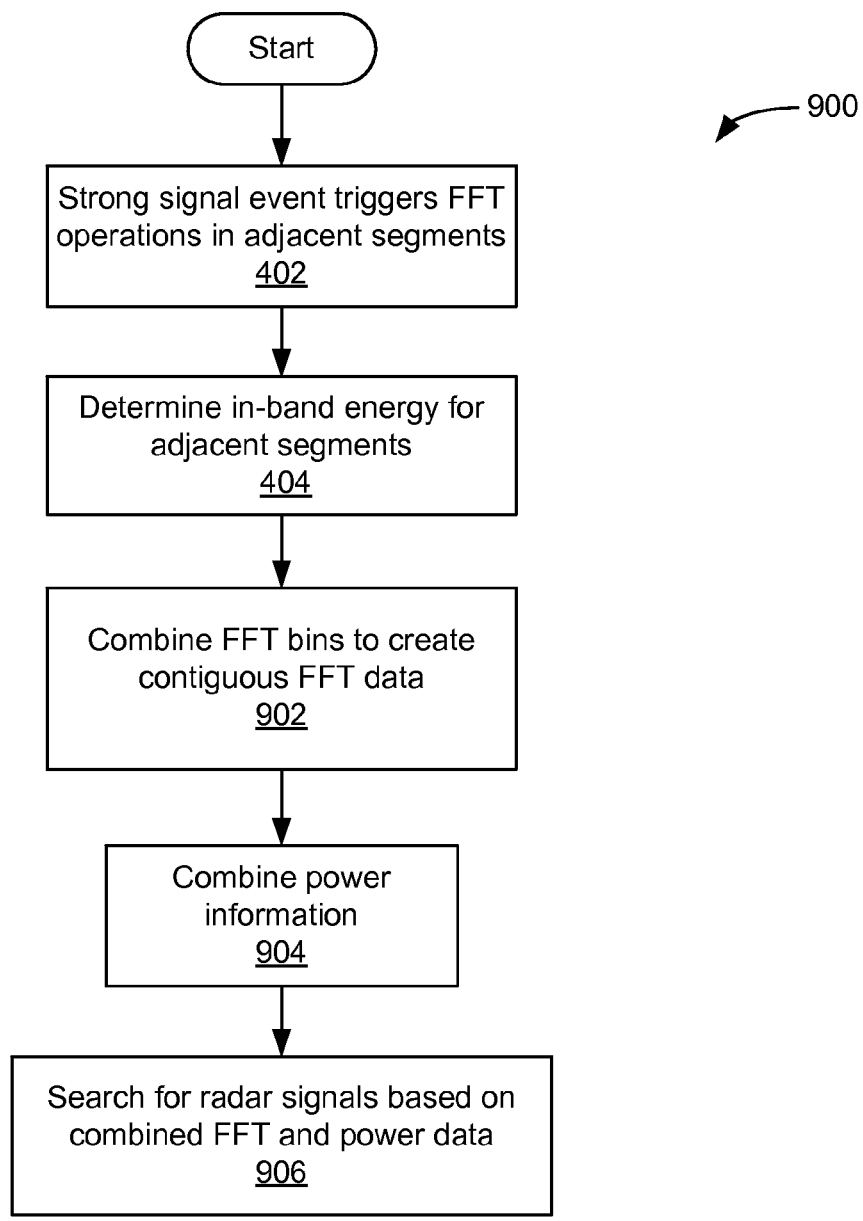
FIG. 9 is a flowchart depicting a third example operation for searching for radar signals.

FIG. 9 is a flowchart depicting a third example operation 900 for searching for radar signals. Referring also to FIGS. 4, 7, and 8, a strong signal event triggers FFT operations on signals received within adjacent frequency segments (402). Next, in-band energy associated with the received signals within the adjacent frequency segments is determined (404). Operations 402 and 404 may be substantially similar to similarly numbered operations described with respect to FIG. 4.

Next, FFT bins may be combined together to create contiguous FFT data (902). For example, the FFT bins 810 from the first processing path P1 and the FFT bins 820 from the second processing path P2 may be combined to generate combined FFT output 830 by the FFT combine block 704. In some embodiments, the FFT bins 810 and the FFT bins 820 may be scaled prior to combining, the scaled down-converted receive signal 210 and/or the scaled down-converted receive signal 212 may be scaled, and/or zero valued FFT bins may be appended to the combined FFT output 830.

Next, power information from the first processing path P1 and the second processing path P2 is combined (904). For example, the power and/or energy data associated with the first processing path P1 may be combined with the power and/or energy data associated with the second processing path P2 by the power combine block 706. In some embodiments, the power and/or energy data associated with each processing path may be scaled prior to combining by power combine block 706. For example, if the digital data signal 211 (e.g., ADC 208 output) is unclipped, then gain settings associated with LNA 202, mixer 204, and/or amplifier 206 may be used to scale the scaled down-converted receive signal 210. If the digital data signal 211 is clipped, then scaling of the scaled down-converted receive signal 210 may be ignored.

Next, radar signals are searched for using the combined FFT output 830 and the combined power and/or energy data (906). For example, chirping radar signals beginning in a first frequency segment and ending in a second frequency segment may be identified via the combined FFT output 830.

In some embodiments, the combined FFT output 830 may provide peak FFT bin, frequency, and information associated with the received signals. In addition, the combined power information (determined at 904) may provide power and/or energy characteristics that may be used to identify radar signals. For example, the combined power information may be used to provide pulse width information and compare relative combined in-band power to combined out-of-band power to help eliminate false radar detections.

In some embodiments, digital data signals from the ADCs 208 and 209 may be filtered and/or upsampled within respective processing paths P1 and P2, and FFT bins may be determined based on combined upsampled data. This is described in more detail below in conjunction with FIGS. 10-12.

Figure 10:
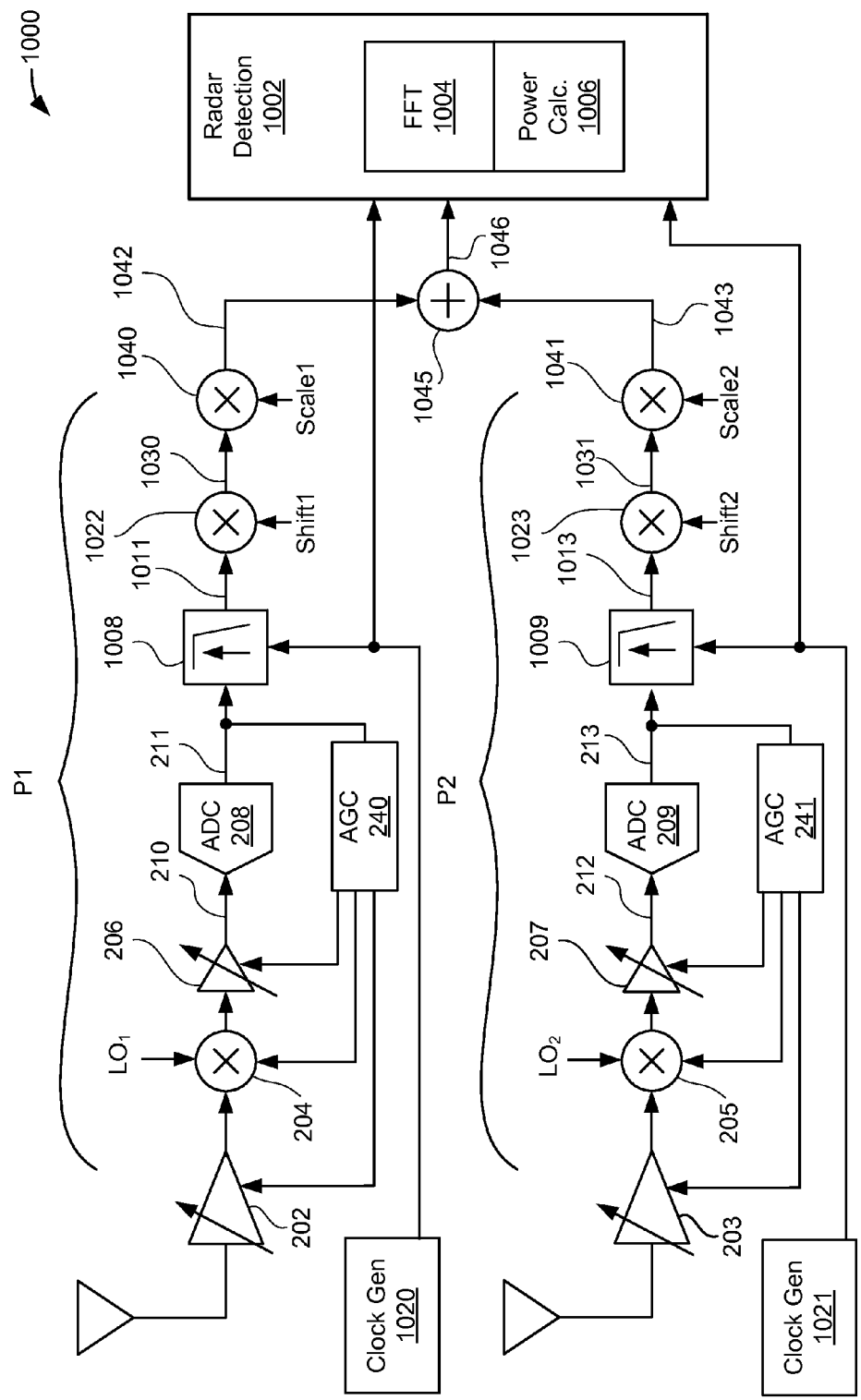
FIG. 10 is a block diagram of a third receiver, in accordance with example embodiments.

FIG. 10 is a block diagram of a third receiver 1000, in accordance with example embodiments. Similar to the first receiver 200 of FIG. 2, the receiver 1000 may include the first processing path P1 and the second processing path P2. The receiver 1000 may also include a radar detection block 1002. The first processing path P1 of the receiver 1000 may include similar elements as those shown in FIG. 2. For example, the first processing path P1 may include the LNA 202, the mixer 204, the amplifier 206, the ADC 208, and the AGC 240. In addition, the first processing path P1 may include an upsampler 1008, a clock generator 1020, a frequency shifter 1022, and a scaling unit 1040. The amplifier 206 may generate the scaled down-converted receive signal 210 and the ADC 208 may generate the digital data signal 211. The upsampler 1008 may generate an upsampled digital data signal 1011 based on a clock signal from the clock generator 1020 and the digital data signal 211. In some embodiments, the upsampler 1008 may include a filter, such as a band-limiting filter to filter the digital data signal 211 prior to upsampling.

The frequency shifter 1022 may "shift" (e.g., move in frequency) the upsampled digital data signal 1011 and generate a shifted upsampled digital data signal 1030. In some embodiments, the frequency shifter 1022 may be implemented by a mixer and the upsampled digital data signal 1011 may be shifted by an amount determined by a Shift1 signal. The frequency shifter 1022 may enable output signals from the first processing path P1 to be shifted with respect to output signals from the second processing path P2. The shifted upsampled digital data signal 1030 may scaled by the scaling unit 1040. In some embodiments, the scaling unit 1040 may be implemented by a mixer and the shifted upsampled digital data signal 1030 may be scaled by an amount determined by a Scale1 signal. The scaling unit 1040 generates a scaling unit output signal 1042 which may be a scaled version of the shifted upsampled digital data signal 1030. The scaling unit 1040 may enable output signals from the first processing path P1 to be scaled with respect to output signals from the second processing path P2. In some embodiments, the frequency shifter 1022 and the scaling unit 1040 may be combined into a single processing element.

In a similar manner, the second processing path P2 may include the LNA 203, the mixer 205, the amplifier 207, the ADC 209, and the AGC 241. In addition, the second processing path P2 may include an upsampler 1009, a clock generator 1021, a frequency shifter 1023, and a scaling unit 1041. The amplifier 207 may generate the scaled down-converted receive signal 212 and the ADC 209 may generate the digital data signal 212. The upsampler 1009 may generate an upsampled digital data signal 1013 based on a clock signal from the clock generator 1021 and the digital data signal 213. In some embodiments, the upsampler 1009 may include a filter, such as a band-limiting filter to filter the digital data signal 213 prior to upsampling.

The frequency shifter 1023 may "shift" the upsampled digital data signal 1013 and generate a shifted upsampled digital data signal 1031. In some embodiments, the frequency shifter 1023 may shift the upsampled digital data signal by an amount determined by a Shift2 signal. The shifted upsampled digital data signal 1031 may scaled by the scaling unit 1041. In some embodiments, the scaling unit 1040 may be implemented by a mixer and the shifted upsampled digital data signal 1030 may be scaled by an amount determined by a Scale1 signal. The scaling unit 1041 may generate a scaling unit output signal 1043 which is a scaled version of the shifted upsampled digital data signal 1031. In some embodiments, the frequency shifter 1023 and the scaling unit 1041 may be combined into a single processing element.

An adder 1045 may sum together the scaling unit output signal 1042 and the scaling unit output signal 1043 and generate a combined digital signal 1046. The combined digital signal 1046 may include data from the first frequency segment (captured by the first processing path P1) and data from the second frequency segment (captured by the second processing path P2). The combined digital signal 1046 is provided to the radar detection block 1002.

The radar detection block 1002 may include an FFT block 1004 and a power calculation block 1006. The FFT block 1004 may determine FFT bins based on the combined digital signal 1046. The power calculation block 1006 may determine an amount of in-band power and/or energy associated with the combined digital signal 1046. The FFT bins provided by the FFT block 1004 and the power and/or energy data provided by the power calculation block 1006 may be used to determine if a radar signal is present within the first frequency segment and/or the second frequency segment. The radar detection block 1002 may select a clock signal from the clock generator 1020 or the clock generator 1021. In some embodiments, the clock signals from each of the clock generators 1020 and 1021 may be substantially similar in frequency.

In some embodiments, the clock generators 1020 and 1021 may generate clock signals that may be multiples of a clock frequency used by the ADC 208 and/or the ADC 209 to upsample the digital data signal 211 and/or the digital data signal 213, respectively. If the clock signal from the clock generator 1020 is twice the frequency of a clock signal used by the ADC 208, then the upsampler 1008 may provide the upsampled digital data signal 1011 having twice the frequency range of the digital data signal 211. In a similar manner, if the clock signal from the clock generator 1021 is twice the frequency of a clock signal used by the ADC 209, then the upsample 1009 may provide the upsampled digital data signal 1013 having twice the frequency range of the digital data signal 213. Although the clock generators 1020 and 1021 are described above as providing a clock signal to double the bandwidth of the upsampled digital data signal 1011 and 1013, respectively, other integer and/or non-integer multiples of clock signals may be generated. For example, the clock generator 1020 may provide a clock signal to generate a four times oversampled digital data signal 1011.

Thus, if the first processing path P1 is configured to have a signal with a bandwidth of 80 MHz, the clock generator 1020 may operate at a frequency to enable the upsampler 1008 to generate an upsampled digital data signal 1011 with a bandwidth of 160 MHz. In a similar manner, if the second processing path P2 is configured to have a signal with a bandwidth of 80 MHz, the clock generator 1021 may operate at a frequency to enable the upsampler 1009 to generate an upsampled digital data signal 1013 with a bandwidth of 160 MHz. In some embodiments, ADC 208 and ADC 209 may run at 160 MHz to support a signal bandwidth of 80 MHz.

Figure 11:
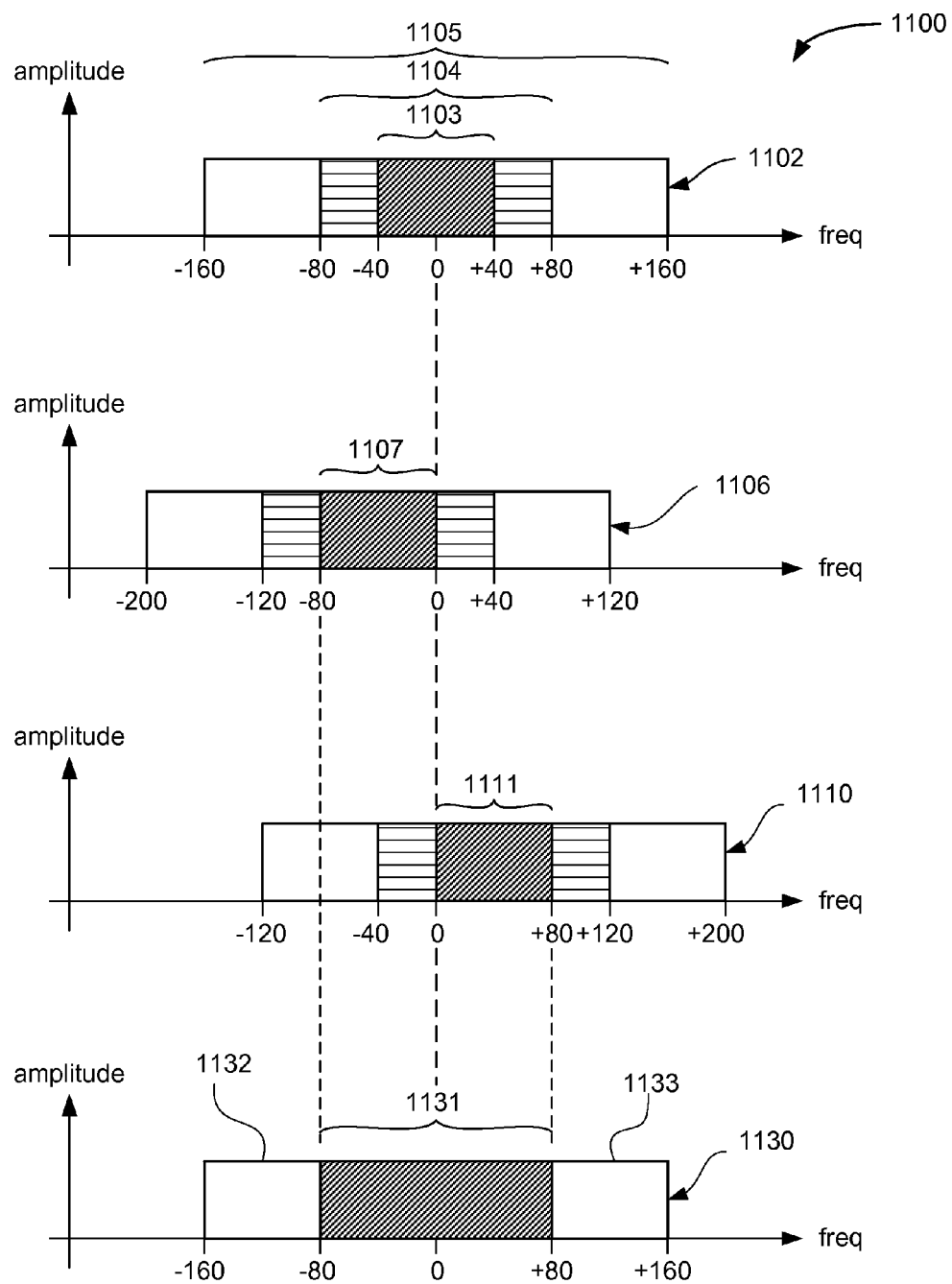
FIG. 11 is a simplified diagram depicting combining data from a first processing path with data from a second processing path to generate a combined signal.

FIG. 11 is a simplified diagram 1100 depicting combining data from the first processing path P1 with data from the second processing path P2 to generate a combined signal. In some embodiments, the clock generators 1020 and 1021 may be configured to generate a clock signal to enable upsampling of the digital data signals 211 and 213. In the discussion that follows, the clock generators 1020 and 1021 are configured to twice (2×) upsample the digital data signals 211 and 213. In other embodiments, the clock generators 1020 and 1021 may be configured to generate other clock signals to enable other upsampling rates.

Graph 1102 depicts a frequency-domain representation of upsampled digital data signal 1011 from first processing path P1 or upsampled digital data signal 1013 from second processing path P2. Graph 1102 may include a frequency segment 1103 (shown with diagonal lines) having a bandwidth of 80 MHz (shown as −40 to +40 MHz). Graph 1102 may also include an ADC output segment 1104 (shown with horizontal lines) that may also include frequency segment 1103. Bandwidth of ADC output segment 1104 may be 160 MHz (shown as −80 MHz to +80 MHz). Thus, ADC output segment 1104 may be a frequency representation of digital data signal 211 or digital data signal 213 (see FIG. 10). In some embodiments, ADC output segment 1104 may include additional frequency content (shown with the horizontal lines) along with the frequency segment 1103 (shown with the diagonal lines). As described above with respect to FIG. 10, digital data signal 211 is upsampled by upsampler 1008 to generate upsampled digital data signal 1011, and digital data signal 213 is upsampled by upsampler 1009 to generate upsampled digital data signal 1013. A frequency-domain representation of upsampled digital data signal 1011 and upsampled digital data signal 1013 is depicted as 1105. Thus, the frequency-domain representation of upsampled digital data signal 1105 may include ADC output segment 1104, which in turn may include frequency segment 1103. Bandwidth of the upsampled digital data signal 1011 and upsampled digital data signal 1013 may be 320 MHz (shown as −160 MHz to +160 MHz).

Graph 1106 depicts a frequency-domain representation of the scaling unit output signal 1042 (see FIG. 10). Graph 1106 may depict a frequency-domain representation of upsampled digital data signal 1011 shifted (in frequency) by frequency shifter 1022. In some embodiments, upsampled digital data signal 1011 may be shifted down in frequency by approximately 40 MHz. Thus, the frequency-domain representation of upsampled digital data signal 1013 (e.g., depicted as graph 1102) may be shifted down approximately 40 MHz as depicted in graph 1106. In some embodiments, bandwidth of the upsampled digital data signal 1011 remains 320 MHz, although frequencies have been shifted to −200 MHz to +120 MHz. Frequency segment 1103 may be shifted as shown with shifted frequency segment 1107.

Graph 1110 depicts a frequency-domain representation of the scaling unit output signal 1043 (see FIG. 10). Graph 1110 may depict a frequency-domain representation of upsampled digital data signal 1013 shifted (in frequency) by frequency shifter 1023. In some embodiments, upsampled digital data signal 1013 may be shifted up in frequency by approximately 40 MHz. Thus, the frequency-domain representation of upsampled digital data signal 1013 (e.g., depicted as graph 1102) may be shifted up approximately 40 MHz as depicted in graph 1110. In some embodiments, bandwidth of the upsampled digital data signal 1011 remains 320 MHz, although frequencies have been shifted to −120 MHz to +200 MHz. Frequency segment 1103 may be shifted as shown with shifted frequency segment 1111.

Graph 1130 depicts a frequency-domain representation of combined digital signal 1046. With filtering that may be provided within first processing path P1 and/or second processing path P2, the combined digital signal 1046 may be generated by adding scaling unit output signal 1042 and scaling unit output signal 1043. Shown graphically, shifted frequency segment 1107 and shifted frequency segment 1111 may be combined to generate combined frequency segment 1131 (shown with diagonal lines). In some embodiments, combined frequency segment 1131 may have a bandwidth of 160 MHz (shown as −80 MHz to +80 MHz). Thus FFT bins based on combined frequency segment 1131 may reflect frequency segments 1107 and 1111. Graph 1130 also shows out-of-band frequency segments 1132 and 1133 (shown as −160 MHz to −80 MHz and +80 MHz to +160 MHz).

As shown in FIG. 11, scaling unit output signal 1042 may be shifted up in frequency (shown in graph 1106) while scaling unit output signal 1043 may be shifted down in frequency (shown in graph 1110). In other embodiments, scaling unit output signal 1042 may be shifted down in frequency while scaling unit output signal 1043 may be shifted up in frequency. In still other embodiments, shift amounts other than 40 MHz may be used.

Figure 12:
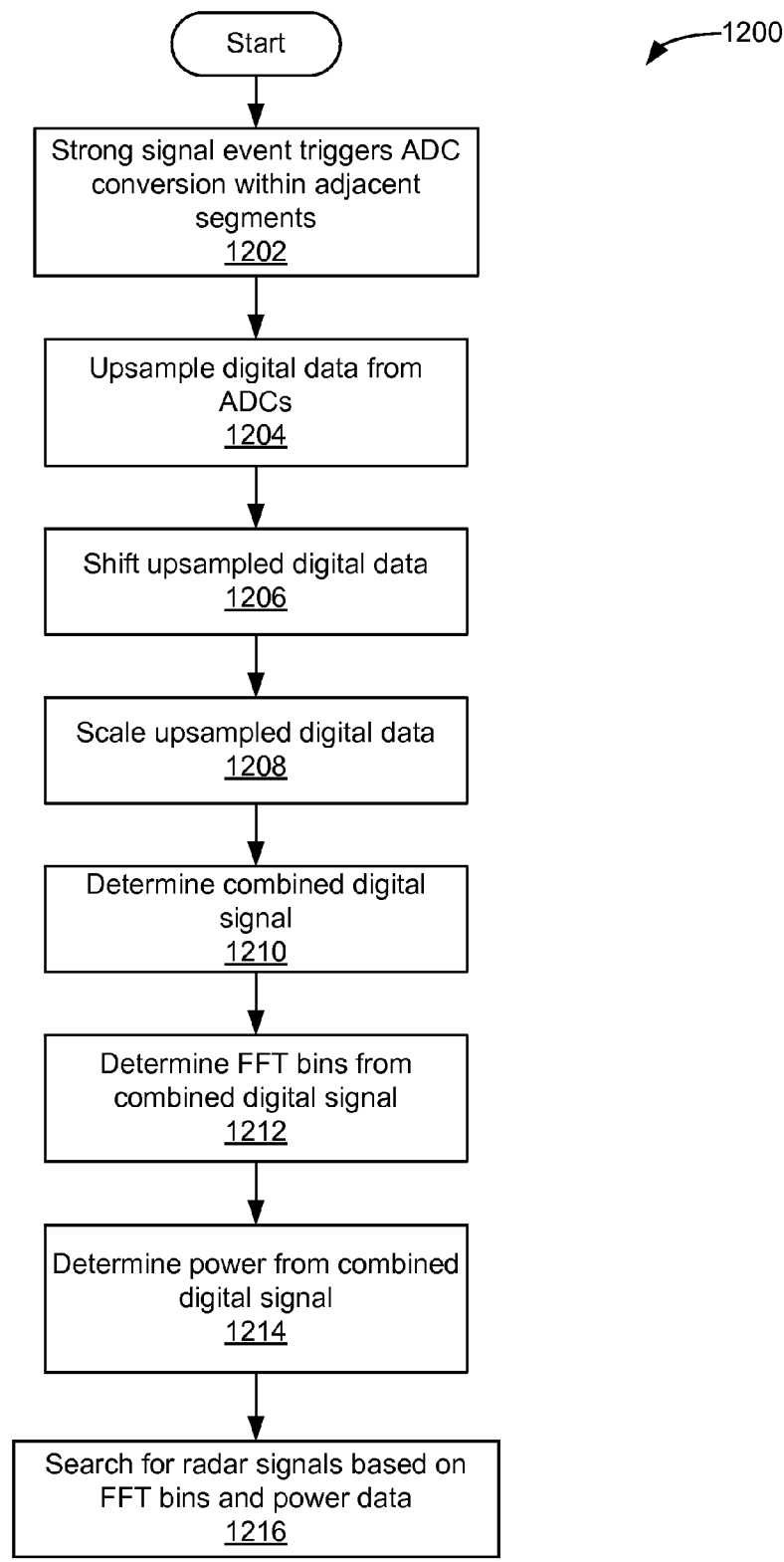
FIG. 12 is a flowchart depicting a fourth example operation for searching for radar signals.

FIG. 12 is a flowchart depicting a fourth example operation 1200 for searching for radar signals. Referring also to FIGS. 4, 10, and 11, a strong signal event triggers ADC conversion operations on signals received within adjacent frequency segments (1202). As described above with respect to FIGS. 4 and 11, strong signal events trigger the ADC 208 and the ADC 209 to convert scaled down-converted receive signals 210 and 212 into digital data signals 211 and 213, respectively. Next, digital data is upsampled (1204). For example digital data signals 211 may be upsampled by the upsampler 1008 and digital data signals 213 may be upsampled by the upsampler 1009. In some embodiments, the clock generator 1020 may be configured to generate a clock signal to enable the upsampler 1008 to generate an upsampled digital data signal 1011. In a similar manner, clock generator 1021 may be configured to generate a clock signal to enable the upsampler 1009 to generate an upsampled digital data signal 1013.

Next, upsampled data is shifted (1206). For example, the upsampled digital data signal 1011 may be shifted in frequency by frequency shifter 1022. Frequency shifter 1022 may generate the shifted upsampled digital data signal 1030. In a similar manner, the upsampled digital data signal 1013 may be shifted in frequency by frequency shifter 1023. Frequency shifter 1023 may generate the shifted upsampled digital data signal 1031.

Next, the shifted upsampled digital data signals are scaled (1208). For example, the shifted upsampled digital data signal 1030 may be scaled by scaling unit 1040 and the shifted upsampled digital data signal 1031 may be scaled by scaling unit 1041. The scaling unit 1040 may generate the scaling unit output signal 1042 and the scaling unit 1041 may generate the scaling unit output signal 1043.

Next, the combined digital signal 1046 is determined (1210). In some embodiments, the scaling unit output signal 1042 may be added to the scaling unit output signal 1043 to generate the combined digital signal 1046. The combined digital signal 1046 may include signals from the first frequency segment 311 and the second frequency segment 312.

Next, FFT bins are determined from the combined digital signal 1046 (1212). For example, the FFT block 1004 may determine FFT bins from the combined digital signal 1046. Next, power and/or energy associated with the combined digital signal 1046 is determined (1214). For example, the power calculation block 1006 may determine the power and/or energy associated with the combined digital signal 1046.

Next, radar signals may be searched for by using the FFT bins determined from the combined digital signal 1046 and power and/or energy data determined from the combined digital signal 1046 (1216). In some embodiments, radar signals may be searched for by the techniques described herein and well-known in the art.

Figure 13:
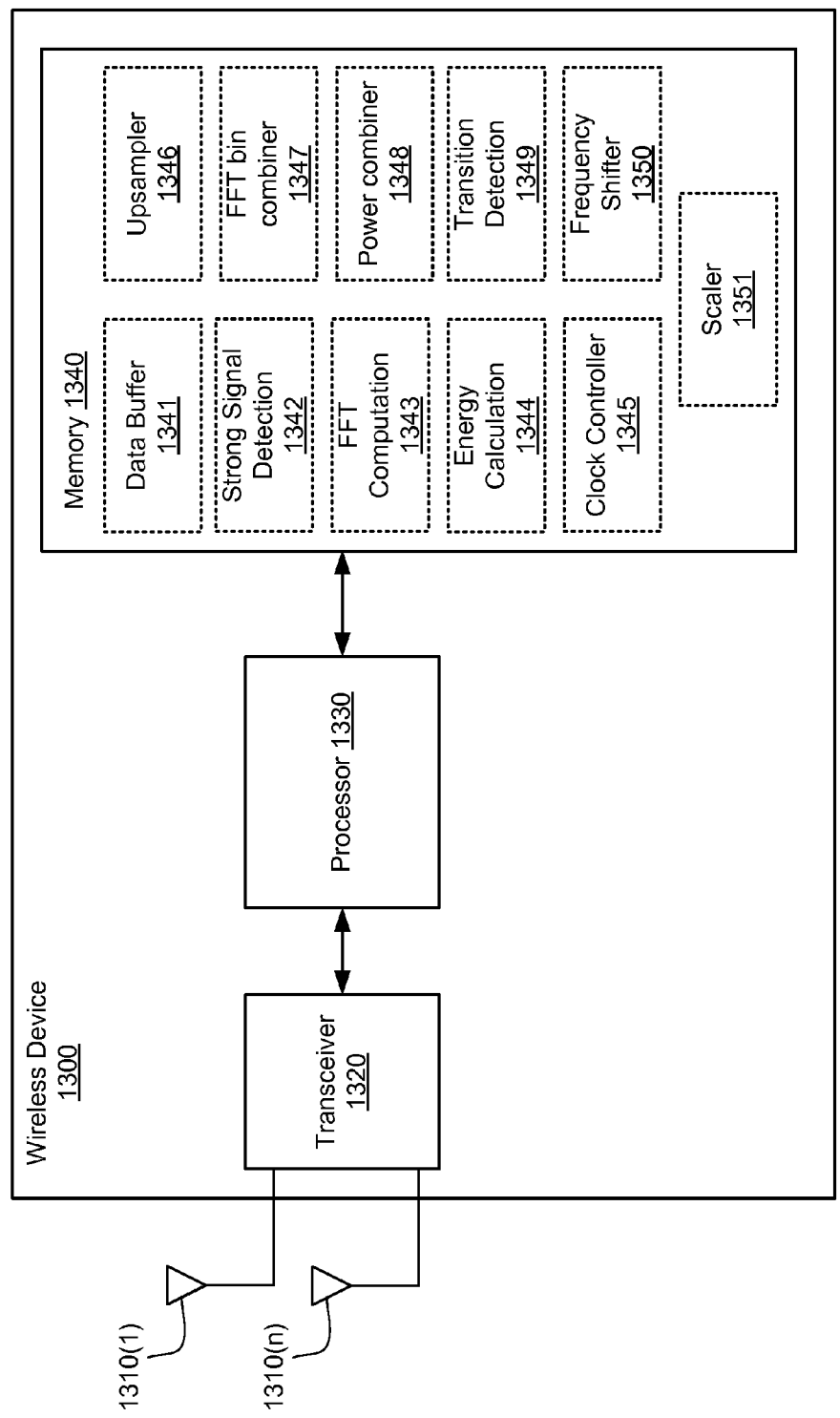
FIG. 13 shows a wireless device that is one embodiment of the wireless devices of FIG. 1.

FIG. 13 shows a wireless device 1300 that is one embodiment of the wireless devices 102 and 103 of FIG. 1. The wireless device 1300 may include a number of antennas 1310(1)-1310(n), transceiver 1320, a processor 1330, and a memory 1340. The transceiver 1320 may be coupled to antennas 1310(1)-1310(n), either directly or through an antenna selection circuit (not shown for simplicity). The transceiver 1320 may be used to transmit signals to and receive signals from other wireless devices. Although not shown in FIG. 13 for simplicity, the transceiver 1320 may include any number of transmit chains to process and transmit signals to other wireless devices via antennas 1310(1)-1310(n), and may include any number of receive chains to process signals received from antennas 1310(1)-1310(n). Thus, for example embodiments, the wireless device 1300 may be configured for multiple-input, multiple-output (MIMO) operations. The MIMO operations may include single-user MIMO (SU-MIMO) operations and multi-user MIMO (MU-MIMO) operations.

The memory 1340 may include a data buffer 1341 that may be used to cache data from the transceiver 1320. In some embodiments, the data buffer 1341 may be shared with the first and the second processing paths P1 and P2 as shown in FIGS. 2, 7, and 10. For example, digital data signal 211 and 213 (not shown for simplicity) may be stored within data buffer 1341. In some embodiments, FFT bins (not shown for simplicity) provided by FFT block 232, FFT block 237, and/or FFT block 1004 may be stored within data buffer 1341.

Further, memory 1340 may also include a non-transitory computer-readable storage medium (e.g., one or more non-volatile memory elements, such as EPROM, EEPROM, Flash memory, a hard drive, etc.) that may store the following software (SW) modules:

- a strong signal detection SW module 1342 to detect strong signal events within the first processing path P1 and/or the second processing path P2;
- an FFT computation SW module 1343 to determine FFT bins associated with the first processing path P1 and/or the second processing path P2;
- an energy calculation SW module 1344 to determine energy and/or power associated with the first processing path P1 and/or the second processing path P2;
- a clock controller SW module 1345 to control clock generation within the first processing path P1 and the second processing path P2;
- an upsampler SW module 1346 to upsample a digital data signal;
- an FFT bin combiner SW module 1347 to combine FFT bins associated with the first processing path P1 and the second processing path P2;

a power combiner SW module 1348 to combine power and/or energy data associated with the first processing path P1 and the second processing path P2;

a transition detection SW module 1349 to determine when a signal may be transitioning from a first frequency segment to a second frequency segment;

a frequency shifter SW module 1350 to shift frequencies associated with an digital data signal; and a scaler SW module 1351 to scale a digital data signal.

Each software module includes program instructions that, when executed by processor 1330, may cause the wireless device 1300 to perform the corresponding function(s). Thus, the non-transitory computer-readable storage medium of memory 1340 may include instructions for performing all or a portion of the operations of FIGS. 4, 6, 9, and/or 12.

Processor 1330, which is coupled to the transceiver 1320 and the memory 1340, may be any one or more suitable processors capable of executing scripts or instructions of one or more software programs stored in the wireless device 1300 (e.g., within the memory 1340).

Processor 1330 may execute the strong signal detection SW module 1342 to detect a strong signal event that may indicate the presence of a radar signal within the communication channel 105. In some embodiments, the strong signal detection SW module 1342 may determine when the LNA 202 and/or the LNA 203 is saturated indicating that a strong signal may be received within the communication channel 105.

Processor 1330 may execute the FFT computation SW module 1343 to compute FFT bins based on signals received within the first frequency segment 311 and the second frequency segment 312. For example, processor 1330 may read data from the ADCs 208 and/or 209 stored in data buffer 1341, compute the FFT bins based on the digital data signals, and store the FFT bins in data buffer 1341.

Processor 1330 may execute the energy calculation SW module 1344 to determine power and/or energy associated with the received signal. In some embodiments, the energy calculation SW module 1344 determines energy based on FFT bins provided by the FFT computation SW module 1343. In other embodiments, the energy calculation SW module 1344 may determine in-band power and/or energy associated with received signals within a frequency segment.

Processor 1330 may execute the clock controller SW module 1345 to control generation of clock signals associated with the first processing path P1 and/or the second processing path P2. In some embodiments, clock controller SW module 1345 may control clock generator 1020 and/or clock generator 1021 to generate clock signals that may be used to upsample down-converted receive signals through ADC 208 and/or ADC 209.

Processor 1330 may execute the upsampler SW module 1346 to upsample the digital data signal 211 and/or the digital data signal 213 to an increased sample rate. In some embodiments, the upsampler SW module 1346 may include a filter, such as a band-limiting filter to filter the digital data signal 211 and/or the digital data signal 213 prior to upsampling. In some embodiments, the upsampler SW module 1346 may interpolate between data samples within the digital data signal 211 and/or the digital data signal 213. In other embodiments, the upsampler SW module 1346 may insert zero valued data samples between data samples within the digital data signal 211 and/or the digital data signal 213 (e.g., zero stuffing).

Processor 1330 may execute the FFT bin combiner SW module 1347 to combine FFT bins associated with the first processing path P1 and FFT bins associated with the second processing path P2 to generate a combined FFT output. In some embodiments, the FFT bin combiner SW module 1347 may cause the processor 1330 to select, average, and/or omit FFT bins associated with the first processing path P1 and the second processing path P2 to generate the combined FFT output.

Processor 1330 may execute the power combiner SW module 1348 to combine power and/or energy data associated with the first processing path P1 and the second processing path P2 and generate a combined power and/or energy data. In some embodiments, the power combiner SW module 1348 may cause the processor 1330 to select, average and/or omit power and/or energy data associated with the first processing path P1 and the second processing path P2 to generate the combined power and/or energy data.

Processor 1330 may execute the transition detection SW module 1349 to determine when a signal received within a first frequency segment may be transitioning to a second frequency segment. In some embodiments, the transition detection SW module 1349 may cause the processor 1330 to determine when one or more FFT bins may be within the transition region 313 and moving toward the second frequency segment.

Processor 1330 may execute the frequency shifter SW module 1350 to shift frequencies of signals associated with the digital data such as upsampled digital data signal 1011 and/or the upsampled digital data signal 1013. In some embodiments, the frequency shifter SW module may cause the processor 1330 to multiply the upsampled digital data signal 1011 and/or the upsampled digital data signal 1013 by a predetermined signal.

Processor 1330 may execute the scaler SW module 1351 to scale a digital signal such as the shifted upsampled digital data signal 1030 and the shifted upsampled digital data signal 1031. In some embodiments, the scaler SW module 1351 may enable a digital data signal associated with the first processing path P1 to be scaled with respect to a digital data signal associated with the second processing path P2, and vice versa.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for searching for a radar signal by a wireless device, the method comprising:

receiving signals, at the wireless device, within a first frequency segment and a second frequency segment, wherein the second frequency segment is adjacent to the first frequency segment;

determining a first set of Fast Fourier Transform (FFT) bins associated with the first frequency segment;

determining a second set of FFT bins associated with the second frequency segment;

combining the first set of FFT bins and the second set of FFT bins to determine a combined FFT output that spans the first frequency segment and the second frequency segment; and searching for the radar signal based, at least in part, on the combined FFT output.

2. The method of claim 1, further comprising:
determining a first energy amount associated with signals received within the first frequency segment;
determining a second energy amount associated with signals received within the second frequency segment; and
combining the first energy amount and the second energy amount to determine a combined energy amount that spans the first frequency segment and the second frequency segment,
wherein searching for the radar signal is based, at least in part, on the combined energy amount.

3. The method of claim 1, wherein determining the first set of FFT bins and the second set of FFT bins is triggered by a strong signal event.

4. The method of claim 1, wherein determining the first set of FFT bins comprises:
scaling signals associated with the first frequency segment based, at least in part, on signals associated with the second frequency segment; and
determining the first set of FFT bins based, at least in part, on the scaled signals associated with the first frequency segment.

5. The method of claim 1, wherein determining the second set of FFT bins comprises:
scaling signals associated with the second frequency segment based, at least in part, on signals associated with the first frequency segment; and
determining the second set of FFT bins based, at least in part, on the scaled signals associated with the second frequency segment.

6. The method of claim 1, wherein combining the first set of FFT bins and the second set of FFT bins comprises:
scaling the first set of FFT bins based, at least in part, on a gain setting associated with the first frequency segment; and
scaling the second set of FFT bins based, at least in part, on a gain setting associated with the second frequency segment.

7. The method of claim 1, wherein combining the first set of FFT bins and the second set of FFT bins comprises:
combining in-band FFT bins from the first set of FFT bins with in-band FFT bins from the second set of FFT bins to determine the combined FFT output.

8. The method of claim 7, further comprising:
appending zero-valued FFT bins to the combined FFT output.

9. The method of claim 7, further comprising:
combining out-of-band FFT bins from the first set of FFT bins and out of band FFT bins from the second set of FFT bins to determine, at least in part, the combined FFT output.

10. The method of claim 1, wherein combining the first set of FFT bins and the second set of FFT bins comprises:
selecting an FFT bin from the first set of FFT bins or the second set of FFT bins based, at least on an associated power or an associated energy or a peak FFT bin value or a pre-determined default assignment or a combination thereof.

11. A method for searching for a radar signal by a wireless device, the method comprising:
receiving signals, at the wireless device, within a first frequency segment and a second frequency segment, wherein the second frequency segment is adjacent to the first frequency segment;
upsampling data associated with the signals received within the first frequency segment to generate a first set of upsampled data;
upsampling data associated with the signals received within the second frequency segment to generate a second set of upsampled data;
combining the first set of upsampled data and the second set of upsampled data to generate a combined digital signal
determining Fast Fourier Transform (FFT) bins based, at least in part, on the combined digital signal; and
searching for the radar signal based, at least in part, on the FFT bins.

12. The method of claim 11, further comprising:
determining an energy amount associated with the combined digital signal; and
searching for the radar signal based, at least in part on the determined energy amount.

13. The method of claim 11, wherein combining the first set of upsampled data and the second set of upsampled data comprises:
frequency shifting the first set of upsampled data;
frequency shifting the second set of upsampled data; and
combining the frequency shifted first set of upsampled data and the frequency shifted second set of upsampled data to generate the combined digital signal.

14. The method of claim 11, wherein combining the first set of upsampled data and the second set of upsampled data comprises
scaling the first set of upsampled data to generate a scaled first set of upsampled data;
scaling the second set of upsampled data to generate a scaled second set of upsampled data; and
combining the scaled first set of upsampled data and the scaled second set of upsampled data to generate the combined digital signal.

15. The method of claim 11, wherein upsampling the data associated with the signals received within the first frequency segment further comprises:
filtering the data associated with the signals received within the first frequency segment.

16. A wireless device, comprising:
a transceiver;
a processor; and
a memory storing instructions that when executed by the processor cause the wireless device to:
receive signals within a first frequency segment and a second frequency segment, wherein the second frequency segment is adjacent to the first frequency segment;
determine a first set of Fast Fourier Transform (FFT) bins associated with the first frequency segment;
determine a second set of FFT bins associated with the second frequency segment;
combine the first set of FFT bins and the second set of FFT bins to determine a combined FFT output that spans the first frequency segment and the second frequency segment; and
search for a radar signal based, at least in part, on the combined FFT output.

17. The wireless device of claim 16, wherein execution of the instructions further causes the wireless device to:
determine a first energy amount associated with signals received within the first frequency segment;
determine a second energy amount associated with signals received within the second frequency segment; and combine the first energy amount and the second energy amount to determine a combined energy amount that spans the first frequency segment and the second frequency segment, wherein the search for the radar signal is based, at least in part, on the combined energy amount.

18. The wireless device of claim 16, wherein execution of the instructions to combine the first set of FFT bins and the second set of FFT bins further causes the wireless device to:

scale the first set of FFT bins based, at least in part, on a gain setting associated with the first frequency segment; and scale the second set of FFT bins based, at least in part, on a gain setting associated with the second frequency segment.

19. The wireless device of claim 16, wherein execution of the instructions to combine the first set of FFT bins and the second set of FFT bins further causes the wireless device to:

combine in-band FFT bins from the first set of FFT bins with in-band FFT bins from the second set of FFT bins to determine the combined FFT output.

20. The wireless device of claim 19, wherein execution of the instructions further causes the wireless device to:

append zero-valued FFT bins to the combined FFT output.

* * * * *